United States Patent
Liu et al.

(10) Patent No.: US 10,542,506 B2
(45) Date of Patent: Jan. 21, 2020

(54) METHOD AND APPARATUS FOR INDICATING UPLINK-DOWNLINK CARRIER FREQUENCY SPACING, AND METHOD AND APPARATUS FOR OBTAINING UPLINK-DOWNLINK CARRIER FREQUENCY SPACING

(71) Applicant: HUAWEI TECHNOLOGIES CO., LTD., Shenzhen, Guangdong (CN)

(72) Inventors: Zheng Liu, Shenzhen (CN); Yubo Yang, Shanghai (CN); Chao Luo, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/971,854

(22) Filed: May 4, 2018

(65) Prior Publication Data
US 2018/0255523 A1 Sep. 6, 2018

Related U.S. Application Data

(63) Continuation of application No. PCT/CN2015/094055, filed on Nov. 6, 2015.

(51) Int. Cl.
*H04W 72/04* (2009.01)
*H04W 56/00* (2009.01)
(Continued)

(52) U.S. Cl.
CPC ..... *H04W 56/001* (2013.01); *H04W 72/0453* (2013.01); *H04W 74/0833* (2013.01);
(Continued)

(58) Field of Classification Search
CPC ..... H04W 56/00; H04W 74/08; H04W 72/04; H04W 88/02; H04W 56/001; H04W 72/0453; H04W 74/0833
See application file for complete search history.

(56) References Cited

U.S. PATENT DOCUMENTS

2010/0149961 A1* 6/2010 Lee ............. H04L 5/0007
370/204
2013/0094409 A1* 4/2013 Li .............. H04W 72/044
370/280
(Continued)

FOREIGN PATENT DOCUMENTS

CN 101365217 A 2/2009
CN 101505538 A 8/2009
(Continued)

OTHER PUBLICATIONS

R1-155995 ZTE,"Considerations on Physical Layer Design of NB-IoT",3GPP TSG RAN WG1 Meeting #82bis,Malmö, Sweden, Oct. 5-9, 2015,total 4 pages.
(Continued)

*Primary Examiner* — Chi Ho A Lee
(74) *Attorney, Agent, or Firm* — Womble Bond Dickinson (US) LLP

(57) ABSTRACT

This disclosure relates to the field of communications technologies, and in particular, to a method and an apparatus for obtaining an uplink-downlink carrier frequency spacing. The method for obtaining an uplink-downlink carrier frequency spacing may include initiating, by user equipment (UE), a request in a first cell to access an NB-IoT, and receiving an indication message sent by a base station. The method may also include determining, by the UE according to the indication information, an uplink-downlink carrier frequency spacing corresponding to the first cell. Therefore, the base station can notify the UE of the uplink-downlink carrier frequency spacing corresponding to the first cell, so that the terminal obtains a correct uplink carrier frequency.

20 Claims, 6 Drawing Sheets

---

301

A base station obtains a determining parameter used to determine an uplink-downlink carrier frequency spacing of a first cell, and generates indication information according to the determining parameter, where the indication message is used to indicate the uplink-downlink carrier frequency spacing of the first cell

302

The base station sends the indication information to a terminal device UE that initiates a request in the first cell to access an NB-IoT

(51) Int. Cl.
*H04W 74/08* (2009.01)
*H04L 29/08* (2006.01)
*H04W 88/02* (2009.01)
*H04W 88/08* (2009.01)

(52) U.S. Cl.
CPC ............ *H04L 67/12* (2013.01); *H04W 88/02* (2013.01); *H04W 88/08* (2013.01)

(56) References Cited

U.S. PATENT DOCUMENTS

| | | | |
|---|---|---|---|
| 2015/0172085 A1* | 6/2015 | Yin | H04L 5/0007 370/329 |
| 2015/0358983 A1* | 12/2015 | Frenger | H04L 1/0006 370/329 |
| 2015/0365926 A1 | 12/2015 | Long et al. | |
| 2016/0227539 A1* | 8/2016 | Ye | H04W 72/0453 |
| 2017/0134881 A1* | 5/2017 | Oh | H04W 4/70 |
| 2017/0332383 A1* | 11/2017 | Frenger | H04L 27/2666 |
| 2018/0077703 A1* | 3/2018 | Sun | H04W 72/0446 |
| 2018/0132244 A1* | 5/2018 | Huang | H04W 72/042 |
| 2018/0212698 A1* | 7/2018 | Sun | H04L 5/0053 |

FOREIGN PATENT DOCUMENTS

| | | |
|---|---|---|
| CN | 101969697 A | 2/2011 |
| CN | 102300158 A | 12/2011 |
| CN | 102958133 A | 3/2013 |
| CN | 104254997 A | 12/2014 |
| EP | 2587874 A1 | 5/2013 |
| WO | 2009108090 A1 | 9/2009 |
| WO | 2013168139 A2 | 11/2013 |

OTHER PUBLICATIONS

R1-156924 Huawei, HiSilicon."Analysis of Channel Raster Impact on NB-IoT",3GPP TSG RAN WG1 Meeting #83, Anaheim, USA, Nov. 15-22, 2015,total 6 pages.

Vodafone, Updated SID on: Provision of low-cost MTC UEs based on LTE. TSG RAN meeting #57 Chicago, USA, Sep. 4-7, 2012, RP-121441, 6 pages.

Vodafone Group Plc., New Study Item on Cellular System Support for Ultra Low Complexity and Low Throughput Internet of Things. 3GPP TSG-GERAN Meeting #62 Valencia, Spain, May 26-30, 2014, GP-140421, 6 pages.

Qualcomm Incorporated, New Work Item: NarrowBand IOT (NB-IOT). 3GPP TSG RAN Meeting #69 Phoenix, USA, Sep. 14-16, 2015, RP-151621, 9 pages.

\* cited by examiner

METHOD AND APPARATUS FOR INDICATING UPLINK-DOWNLINK CARRIER FREQUENCY SPACING, AND METHOD AND APPARATUS FOR OBTAINING UPLINK-DOWNLINK CARRIER FREQUENCY SPACING

CROSS-REFERENCE TO RELATED APPLICATIONS

This application is a continuation of International Application No. PCT/CN2015/094055, filed on Nov. 6, 2015, which is hereby incorporated by reference in its entirety.

TECHNICAL FIELD

This disclosure relates to the field of communications technologies, and in particular, to a method and an apparatus for indicating an uplink-downlink carrier frequency spacing, and a method and an apparatus for obtaining an uplink-downlink carrier frequency spacing.

BACKGROUND

The Internet of Things (IoT) is "the Internet connecting things", and the Internet of Things extends a client scope of the Internet to articles for information exchange and communication. This communication mode is also referred to as machine type communication (MTC), and a communications node in this communication mode is referred to as an MTC terminal. A typical application of the Internet of Things includes smart metering, smart household, and the like. Because the Internet of Things needs to be applied to various scenarios such as outdoor, indoor, and underground environments, many special requirements are imposed on design of the Internet of Things.

First, the Internet of Things needs to have relatively good coverage performance. Many MTC devices such as a meter and a water meter are located in a relatively poor coverage environment. The MTC devices are generally installed in a place with an extremely weak wireless network signal such as an indoor corner or even a basement, and in this case, a coverage enhancement technology is required to implement coverage of the Internet of Things.

Second, the Internet of Things needs to support a large quantity of low-rate devices. A quantity of MTC devices is far greater than a quantity of devices used for communication among people. However, a data packet transmitted by the MTC device is extremely small, and is delay-insensitive.

Third, an Internet of Things device needs to have extremely low costs. Many MTC applications need to obtain and use an MTC device with extremely low costs, so as to facilitate deployment on a large scale.

Fourth, an Internet of Things device needs to feature low energy consumption. In most cases, an MTC device is battery-powered. However, in many cases, the MTC is required to operate properly for more than a decade without a battery change, and this requires that the MTC device can operate with extremely low power consumption.

So far, an expected objective of low costs, wide coverage, and low energy consumption still cannot be achieved. To satisfy these special requirements, in a recent topic of Narrowband Internet of Things (NB-IoT), three NB-IoT operation modes are defined:

(1) Standalone operation (Standalone operation): That is, an independent frequency band, for example, one or more carriers in a Global System for Mobile Communication (GSM) network, is used.

When the standalone operation is used, an NB-IoT uplink-downlink frequency band spacing is the same as a current GSM uplink-downlink frequency band spacing, and therefore no special processing is required.

(2) In-band operation (In-band operation): One or more physical resource blocks (PRB) on a Long Term Evolution (LTE) carrier are used.

Referring to FIG. 1, an LTE downlink carrier frequency is $f_{LTE}^{DL}$, and an LTE uplink carrier frequency is $f_{LTE}^{UL}$, and therefore a carrier frequency spacing thereof is $|f_{LTE}^{DL} - f_{LTE}^{UL}|$. In the LTE downlink carrier frequency, because an intermediate subcarrier of 15 kHz serves as a central direct current (DC) subcarrier and is not used, when the in-band operation is used by the NB-IoT, there is a deviation between an NB-IoT uplink-downlink carrier frequency spacing and the LTE uplink-downlink carrier frequency spacing. As shown in FIG. 1, a left side in the figure shows downlink carrier frequencies, and a right side in the figure shows uplink carrier frequencies. If uplink and downlink physical resource blocks used for uplink NB-IoT transmission have the same indexes as those used in LTE, when an NB-IoT carrier frequency is located on a left side of an LTE center carrier frequency, the NB-IoT uplink-downlink carrier frequency spacing is $|f_{LTE}^{DL} - f_{LTE}^{UL}| + 7.5$ kHz; or when an NB-IoT carrier frequency is located on a right side of an LTE center carrier frequency, the NB-IoT uplink-downlink carrier frequency is $|f_{LTE}^{DL} - f_{LTE}^{UL}| - 7.5$ kHz.

(3) Guard band operation (Guard band operation): An unused resource block in an LTE carrier guard band is used.

Referring to FIG. 2, when the guard band operation mode is used, a problem, similar to that in the in-band operation, that there is a deviation between an NB-IoT uplink-downlink carrier frequency spacing and an LTE uplink-downlink carrier frequency spacing may also exist.

In FIG. 2, $\Delta_1$ and $\Delta_2$ are NB-IoT uplink-downlink carrier frequency spacings, the LTE uplink-downlink carrier frequency spacing is $|f_{LTE}^{DL} - f_{LTE}^{UL}|$, and there is a deviation between $|f_{LTE}^{DL} - f_{LTE}^{UL}|$ and each of $\Delta_1$ and $\Delta_2$.

In addition, if different physical resource blocks are used for an LTE uplink and downlink, there is a deviation between the NB-IoT uplink-downlink carrier frequency spacing and the LTE uplink-downlink carrier frequency spacing.

It may be learned from the foregoing description that because the NB-IoT uplink-downlink carrier frequency spacing is inconsistent with the LTE uplink-downlink carrier frequency spacing, if a terminal continues to use the uplink-downlink carrier frequency spacing defined in the LTE, there is a deviation between an uplink carrier frequency used by the terminal and an actual NB-IoT uplink carrier frequency allocated to the terminal. Consequently, the terminal makes a mistake in determining the NB-IoT uplink carrier frequency, interference to an adjacent frequency band is caused, and available bandwidth is wasted.

SUMMARY

Embodiments of the present invention provide a method and an apparatus for indicating an uplink-downlink carrier frequency spacing, and a method and an apparatus for obtaining an uplink-downlink carrier frequency spacing, so that a terminal obtains a correct NB-IoT system uplink carrier frequency.

Specific technical solutions provided in the embodiments of the present invention are as follows:

According to a first aspect, a method for indicating an uplink-downlink carrier frequency spacing is provided, where the method is applied to a Narrowband Internet of Things NB-IoT system, and includes:

obtaining, by a base station, a determining parameter used to determine an uplink-downlink carrier frequency spacing of a first cell, and generating indication information according to the determining parameter, where the indication message is used to indicate the uplink-downlink carrier frequency spacing of the first cell; and sending, by the base station, the indication information to a terminal device (UE) that initiates a request in the first cell to access an NB-IoT.

With reference to the first aspect, in a first possible embodiment of the first aspect, when the base station determines that an NB-IoT operation mode preset by the first cell is an in-band operation mode, the determining parameter that is obtained by the base station and that is used to determine the uplink-downlink carrier frequency spacing of the first cell includes: a first carrier frequency deviation that is corresponding to the first cell and that is determined according to a frequency band used by the first cell, an uplink-downlink basic carrier frequency spacing corresponding to the frequency band used by the first cell, and a difference between index numbers of uplink and downlink physical resource blocks used by the first cell.

With reference to the first possible embodiment of the first aspect, in a second possible embodiment of the first aspect, the generating, by a base station, indication information according to the determining parameter includes:

generating, by the base station, indication information that carries the uplink-downlink basic carrier frequency spacing corresponding to the frequency band used by the first cell, an index number corresponding to the first carrier frequency deviation in a first carrier frequency deviation set, and the difference between the index numbers of the uplink and downlink physical resource blocks used by the first cell, where the first carrier frequency deviation set includes all possible carrier frequency deviations and index numbers corresponding to all the carrier frequency deviations, or includes all possible in-band carrier frequency deviations and index numbers corresponding to all the in-band carrier frequency deviations.

With reference to the first aspect, in a third possible embodiment of the first aspect, when the base station determines that an NB-IoT operation mode preset by the first cell is a guard band operation mode, the determining parameter that is obtained by the base station and that is used to determine the uplink-downlink carrier frequency spacing of the first cell includes: a second carrier frequency deviation that is corresponding to the first cell and that is determined according to a frequency band used by the first cell, an uplink-downlink basic carrier frequency spacing corresponding to the frequency band used by the first cell, and a subcarrier quantity deviation corresponding to the first cell.

With reference to the third possible embodiment of the first aspect, in a fourth possible embodiment of the first aspect, the generating, by a base station, indication information according to the determining parameter includes:

generating, by the base station, indication information that carries the uplink-downlink basic carrier frequency spacing corresponding to the frequency band used by the first cell, an index number corresponding to the second carrier frequency deviation in a second carrier frequency deviation set, and the subcarrier quantity deviation corresponding to the first cell, where the second carrier frequency deviation set includes all possible carrier frequency deviations and index numbers corresponding to all the carrier frequency deviations, or includes all possible guard band carrier frequency deviations and index numbers corresponding to all the guard band carrier frequency deviations.

With reference to any one of the first aspect or the possible embodiments of the first aspect, in a fifth possible embodiment, the generating, by a base station, indication information according to the determining parameter includes:

determining, by the base station, the uplink-downlink carrier frequency spacing of the first cell according to the determining parameter; and generating, by the base station, indication information that carries the uplink-downlink carrier frequency spacing of the first cell, or generating, by the base station, indication information that carries an index number corresponding to the uplink-downlink carrier frequency spacing of the first cell in a preset carrier frequency spacing set, where if an NB-IoT operation mode preset by the first cell is an in-band operation mode, the preset carrier frequency spacing set includes all possible carrier frequency spacings and index numbers corresponding to all the carrier frequency spacings, or includes all possible in-band carrier frequency deviations and index numbers corresponding to all the in-band carrier frequency deviations; or if an NB-IoT operation mode preset by the first cell is a guard band operation mode, the preset carrier frequency spacing set includes all possible carrier frequency spacings and index numbers corresponding to all the carrier frequency spacings, or includes all possible guard band carrier frequency deviations and index numbers corresponding to all the guard band carrier frequency deviations.

With reference to any one of the first aspect or the possible embodiments of the first aspect, in a sixth possible embodiment, the determining, by the base station, the uplink-downlink carrier frequency spacing of the first cell according to the determining parameter includes:

when the base station determines that the NB-IoT operation mode preset by the first cell is the in-band operation mode, calculating, by the base station according to the determining parameter, a sum of the first carrier frequency deviation, an uplink-downlink basic carrier frequency spacing corresponding to a frequency band used by the first cell, and a product of physical resource block bandwidth and a difference between index numbers of the uplink and downlink physical resource blocks, to obtain the uplink-downlink carrier frequency spacing of the first cell.

With reference to any one of the first aspect or the possible embodiments of the first aspect, in a seventh possible embodiment, the determining, by the base station, the uplink-downlink carrier frequency spacing of the first cell according to the determining parameter includes:

when the base station determines that the NB-IoT operation mode preset by the first cell is the guard band operation mode, calculating, by the base station according to the determining parameter, a sum of an uplink-downlink basic carrier frequency spacing corresponding to a frequency band used by the first cell, the second carrier frequency deviation, and a product of the subcarrier quantity deviation and subcarrier bandwidth, to obtain the uplink-downlink carrier frequency spacing of the first cell.

With reference to any one of the first aspect or the possible embodiments of the first aspect, in an eighth possible embodiment, the determining parameter that is obtained by the base station and that is used to determine the uplink-downlink carrier frequency spacing of the first cell includes an uplink center frequency corresponding to the first cell; and the generating, by a base station, indication information according to the determining parameter includes:
generating, by the base station, indication information that carries the uplink center frequency corresponding to the first cell.

With reference to any one of the first aspect or the possible embodiments of the first aspect, in a ninth possible embodiment, the determining parameter that is obtained by the base station and that is used to determine the uplink-downlink carrier frequency spacing of the first cell includes index numbers of uplink and downlink physical resource blocks corresponding to the first cell; and the generating, by a base station, indication information according to the determining parameter includes:
generating, by the base station, indication information that carries the index numbers of the uplink and downlink physical resource blocks corresponding to the first cell.

With reference to any one of the first aspect or the possible embodiments of the first aspect, in a tenth possible embodiment, the sending, by the base station, the indication information to a terminal device (UE) that initiates a request in the first cell to access an NB-IoT includes:
determining, by the base station, a total quantity L of sequences included in a candidate sequence set of a primary synchronization signal (PSS) and a secondary synchronization signal SSS, and extending the total quantity of sequences included in the candidate sequence set from L to L+K, where
information that can be indicated by each sequence is increased from $\log_2(L)$ bits to $\log_2(L+K)$ bits, and L and K are positive integers; and
after performing network synchronization with the UE by using the PSS and the SSS that are corresponding to the first cell, notifying, by the base station, the UE by adding the indication information to a newly added message of $\log_2(L+K)-\log_2(L)$ bits.

With reference to any one of the first aspect or the possible embodiments of the first aspect, in an eleventh possible embodiment, the sending, by the base station, the indication information to a terminal device (UE) that initiates a request in the first cell to access an NB-IoT includes:
after the base station completes network synchronization with the UE, notifying, by the base station, the UE by using broadcast information that carries the indication information.

With reference to any one of the first aspect or the possible embodiments of the first aspect, in a twelfth possible embodiment, the broadcast message that carries the indication message carries the indication message in a master information block MIB or a system information block SIB.

With reference to any one of the first aspect or the possible embodiments of the first aspect, in a thirteenth possible embodiment, the sending, by the base station, the indication information to a terminal device (UE) that initiates a request in the first cell to access an NB-IoT includes:
after the base station allocates a physical random access channel PRACH to the UE, notifying, by the base station, the UE by adding the indication information to random access channel (RACH) response information or higher layer signaling.

According to a second aspect, a method for obtaining an uplink-downlink carrier frequency spacing is provided, where the method is applied to an NB-IoT system, and includes:
initiating, by UE, a request in a first cell to access an NB-IoT, and receiving an indication message sent by a base station, where the indication message is used to indicate an uplink-downlink carrier frequency spacing corresponding to the first cell; and
determining, by the UE according to the indication information, the uplink-downlink carrier frequency spacing corresponding to the first cell.

With reference to the second aspect, in a first possible embodiment of the second aspect, the receiving, by UE, an indication message sent by a base station includes:
after the UE performs network synchronization with the base station by using a PSS and an SSS that are corresponding to the first cell, parsing, by the UE, the indication information carried in a newly added message of $\log_2(L+K)-\log_2(L)$ bits, where
a total quantity of sequences included in a candidate sequence set of the PSS and the SSS is extended from L to L+K, and L and K are positive integers.

With reference to the second aspect, in a second possible embodiment of the second aspect, the receiving, by UE, an indication message sent by a base station includes:
after the UE completes network synchronization with the base station, receiving, by the UE, broadcast information that is sent by the base station and that carries the indication message.

With reference to the second aspect, in a third possible embodiment of the second aspect, the broadcast message that carries the indication message carries the indication message in a master information block MIB or a system information block SIB.

With reference to any one of the second aspect or the possible embodiments of the second aspect, in a fourth possible embodiment, the receiving, by UE, an indication message sent by a base station includes:
receiving, by the UE, a broadcast message that is sent by the base station and that does not carry the indication message, and obtaining random access channel PRACH information by using the broadcast information that does not carry the indication message;
sending, by the UE, a random access message to the base station according to the PRACH information; and
receiving, by the UE, RACH response information or higher layer signaling sent by the base station, where the RACH response information carries the indication message, or the higher layer signaling carries the indication message.

With reference to any one of the second aspect or the possible embodiments of the second aspect, in a fifth possible embodiment, the determining, by the UE according to the indication information, the uplink-downlink carrier frequency spacing corresponding to the first cell includes:
when the UE determines that the indication information carries an uplink-downlink basic carrier frequency spacing corresponding to a frequency band used by the first cell, an index number corresponding to the first carrier frequency deviation in a first carrier frequency deviation set, and a difference between index numbers of uplink and downlink physical resource blocks used by the first cell, determining, by the UE, the first carrier frequency deviation according to the index number corresponding to the first carrier frequency deviation in the first carrier frequency deviation set; and calculating, by the UE, a sum of the first carrier frequency deviation, the basic carrier frequency spacing, and a product of physical resource block bandwidth and the difference between the index numbers of the uplink and downlink physical resource blocks, to obtain the uplink-downlink carrier frequency spacing of the first cell, where the first carrier frequency deviation set includes all possible carrier frequency deviations and index numbers corresponding to all the carrier frequency deviations, or includes all possible in-band carrier frequency deviations and index numbers corresponding to all the in-band carrier frequency deviations.

With reference to any one of the second aspect or the possible embodiments of the second aspect, in a sixth possible embodiment, the determining, by the UE according to the indication information, the uplink-downlink carrier frequency spacing corresponding to the first cell includes:

when the UE determines that the indication information carries an uplink-downlink basic carrier frequency spacing corresponding to a frequency band used by the first cell, an index number corresponding to the second carrier frequency deviation in a second carrier frequency deviation set, and a subcarrier quantity deviation corresponding to the first cell, determining, by the UE, the second carrier frequency deviation according to the index number corresponding to the second carrier frequency deviation in the second carrier frequency deviation set; and calculating, by the UE, a sum of the basic carrier frequency spacing, the second carrier frequency deviation, and a product of the subcarrier quantity deviation and subcarrier bandwidth, to obtain the uplink-downlink carrier frequency spacing of the first cell, where the second carrier frequency deviation set includes all possible carrier frequency deviations and index numbers corresponding to all the carrier frequency deviations, or includes all possible guard band carrier frequency deviations and index numbers corresponding to all the guard band carrier frequency deviations.

With reference to any one of the second aspect or the possible embodiments of the second aspect, in a seventh possible embodiment, the determining, by the UE according to the indication information, the uplink-downlink carrier frequency spacing corresponding to the first cell includes:

when the UE determines that the indication information carries the uplink-downlink carrier frequency spacing of the first cell, directly obtaining, by the UE, the uplink-downlink carrier frequency spacing of the first cell.

With reference to any one of the second aspect or the possible embodiments of the second aspect, in an eighth possible embodiment, the determining, by the UE according to the indication information, the uplink-downlink carrier frequency spacing corresponding to the first cell includes:

determining, by the UE, that the indication information carries an index number corresponding to the uplink-downlink carrier frequency spacing of the first cell in a preset carrier frequency spacing set; and determining, by the UE, the uplink-downlink carrier frequency spacing of the first cell according to the index number corresponding to the uplink-downlink carrier frequency spacing of the first cell in the preset carrier frequency spacing set, where if an NB-IoT operation mode preset by the first cell is an in-band operation mode, the preset carrier frequency spacing set includes all possible carrier frequency spacings and index numbers corresponding to all the carrier frequency spacings, or includes all possible in-band carrier frequency deviations and index numbers corresponding to all the in-band carrier frequency deviations; or if an NB-IoT operation mode preset by the first cell is identified as a guard band operation mode, the preset carrier frequency spacing set includes all possible carrier frequency spacings and index numbers corresponding to all the carrier frequency spacings, or includes all possible guard band carrier frequency deviations and index numbers corresponding to all the guard band carrier frequency deviations.

With reference to any one of the second aspect or the possible embodiments of the second aspect, in a ninth possible embodiment, the determining, by the UE according to the indication information, the uplink-downlink carrier frequency spacing corresponding to the first cell includes:

determining, by the UE, that the indication information carries an uplink center frequency corresponding to the first cell, and using, by the UE, the uplink center frequency for access.

With reference to any one of the second aspect or the possible embodiments of the second aspect, in a tenth possible embodiment, the determining, by the UE according to the indication information, the uplink-downlink carrier frequency spacing corresponding to the first cell includes:

determining, by the UE, that the indication information carries index numbers of uplink and downlink physical resource blocks corresponding to the first cell, and determining, by the UE, a corresponding index number of an LTE uplink physical resource block according to the index number of the downlink physical resource block corresponding to the first cell; and determining, according to the index number of the LTE uplink physical resource block and the index number of the uplink physical resource block corresponding to the first cell, a first carrier frequency deviation corresponding to the first cell and an uplink-downlink basic carrier frequency spacing corresponding to a frequency band used by the first cell, and calculating a sum of the first carrier frequency deviation and the basic carrier frequency spacing to obtain the uplink-downlink carrier frequency spacing of the first cell.

According to a third aspect, an apparatus for indicating an uplink-downlink carrier frequency spacing is provided, where the apparatus is applied to a Narrowband Internet of Things NB-IoT system, and includes:

a generation unit, configured to: obtain a determining parameter used to determine an uplink-downlink carrier frequency spacing of a first cell, and generate indication information according to the determining parameter, where the indication message is used to indicate the uplink-downlink carrier frequency spacing of the first cell; and a sending unit, configured to send the indication information to a terminal device (UE) that initiates a request in the first cell to access an NB-IoT.

With reference to the third aspect, in a first possible embodiment of the third aspect, when the generation unit determines that an NB-IoT operation mode preset by the first cell is an in-band operation mode, the obtained determining parameter used to determine the uplink-downlink carrier frequency spacing of the first cell includes: a first carrier frequency deviation that is corresponding to the first cell and that is determined according to a frequency band used by the first cell, an uplink-downlink basic carrier frequency spacing corresponding to the frequency band used by the first cell, and a difference between index numbers of uplink and downlink physical resource blocks used by the first cell.

With reference to the first possible embodiment of the third aspect, in a second possible embodiment of the third aspect, when generating the indication information according to the determining parameter, the generation unit is configured to:

generate indication information that carries the uplink-downlink basic carrier frequency spacing corresponding to the frequency band used by the first cell, an index number corresponding to the first carrier frequency deviation in a first carrier frequency deviation set, and the difference between the index numbers of the uplink and downlink physical resource blocks used by the first cell, where the first carrier frequency deviation set includes all possible carrier frequency deviations and index numbers corresponding to all the carrier frequency deviations, or includes all possible in-band carrier frequency deviations and index numbers corresponding to all the in-band carrier frequency deviations.

With reference to the third aspect, in a third possible embodiment of the third aspect, when the generation unit determines that an NB-IoT operation mode preset by the first cell is a guard band operation mode, the obtained determining parameter used to determine the uplink-downlink carrier frequency spacing of the first cell includes: a second carrier frequency deviation that is corresponding to the first cell and that is determined according to a frequency band used by the first cell, an uplink-downlink basic carrier frequency spacing corresponding to the frequency band used by the first cell, and a subcarrier quantity deviation corresponding to the first cell.

With reference to the third possible embodiment of the third aspect, in a fourth possible embodiment of the third aspect, when generating the indication information according to the determining parameter, the generation unit is configured to:

generate indication information that carries the uplink-downlink basic carrier frequency spacing corresponding to the frequency band used by the first cell, an index number corresponding to the second carrier frequency deviation in a second carrier frequency deviation set, and the subcarrier quantity deviation corresponding to the first cell, where the second carrier frequency deviation set includes all possible carrier frequency deviations and index numbers corresponding to all the carrier frequency deviations, or includes all possible guard band carrier frequency deviations and index numbers corresponding to all the guard band carrier frequency deviations.

With reference to any one of the third aspect or the possible embodiments of the third aspect, in a fifth possible embodiment, when generating the indication information according to the determining parameter, the generation unit is configured to:

determine the uplink-downlink carrier frequency spacing of the first cell according to the determining parameter; and generate indication information that carries the uplink-downlink carrier frequency spacing of the first cell, or generate indication information that carries an index number corresponding to the uplink-downlink carrier frequency spacing of the first cell in a preset carrier frequency spacing set, where if an NB-IoT operation mode preset by the first cell is an in-band operation mode, the preset carrier frequency spacing set includes all possible carrier frequency spacings and index numbers corresponding to all the carrier frequency spacings, or includes all possible in-band carrier frequency deviations and index numbers corresponding to all the in-band carrier frequency deviations; or if an NB-IoT operation mode preset by the first cell is a guard band operation mode, the preset carrier frequency spacing set includes all possible carrier frequency spacings and index numbers corresponding to all the carrier frequency spacings, or includes all possible guard band carrier frequency deviations and index numbers corresponding to all the guard band carrier frequency deviations.

With reference to any one of the third aspect or the possible embodiments of the third aspect, in a sixth possible embodiment, when determining the uplink-downlink carrier frequency spacing of the first cell according to the determining parameter, the generation unit is configured to:

when determining that the NB-IoT operation mode preset by the first cell is the in-band operation mode, calculate, according to the determining parameter, a sum of the first carrier frequency deviation, an uplink-downlink basic carrier frequency spacing corresponding to a frequency band used by the first cell, and a product of physical resource block bandwidth and a difference between index numbers of the uplink and downlink physical resource blocks, to obtain the uplink-downlink carrier frequency spacing of the first cell.

With reference to any one of the third aspect or the possible embodiments of the third aspect, in a seventh possible embodiment, when determining the uplink-downlink carrier frequency spacing of the first cell according to the determining parameter, the generation unit is configured to:

when determining that the NB-IoT operation mode preset by the first cell is the guard band operation mode, calculate, according to the determining parameter, a sum of an uplink-downlink basic carrier frequency spacing corresponding to a frequency band used by the first cell, the second carrier frequency deviation, and a product of the subcarrier quantity deviation and subcarrier bandwidth, to obtain the uplink-downlink carrier frequency spacing of the first cell.

With reference to any one of the third aspect or the possible embodiments of the third aspect, in an eighth possible embodiment, the determining parameter that is obtained by the generation unit and that is used to determine the uplink-downlink carrier frequency spacing of the first cell includes an uplink center frequency corresponding to the first cell; and the generating indication information according to the determining parameter includes:

generating indication information that carries the uplink center frequency corresponding to the first cell.

With reference to any one of the third aspect or the possible embodiments of the third aspect, in a ninth possible embodiment, the determining parameter that is obtained by the generation unit and that is used to determine the uplink-downlink carrier frequency spacing of the first cell includes index numbers of uplink and downlink physical resource blocks corresponding to the first cell; and the generating indication information according to the determining parameter includes:

generating indication information that carries the index numbers of the uplink and downlink physical resource blocks corresponding to the first cell.

With reference to any one of the third aspect or the possible embodiments of the third aspect, in a tenth possible embodiment, when sending the indication information to the terminal device (UE) that initiates a request in the first cell to access the NB-IoT, the sending unit is configured to:

determine a total quantity L of sequences included in a candidate sequence set of a primary synchronization signal (PSS) and a secondary synchronization signal (SSS), and extend the total quantity of sequences included in the candidate sequence set from L to L+K, where information that can be indicated by each sequence is increased from $\log_2(L)$ bits to $\log_2(L+K)$ bits, and L and K are positive integers; and after performing network synchronization with the UE by using the PSS and the SSS that are corresponding to the first cell, notify the UE by adding the indication information to a newly added message of $\log_2(L+K)-\log_2(L)$ bits.

With reference to any one of the third aspect or the possible embodiments of the third aspect, in an eleventh possible embodiment, when sending the indication information to the terminal device (UE) that initiates a request in the first cell to access the NB-IoT, the sending unit is configured to:

after completing network synchronization with the UE, notify the UE by using broadcast information that carries the indication information.

With reference to any one of the third aspect or the possible embodiments of the third aspect, in a twelfth possible embodiment, the broadcast message that carries the indication message carries the indication message in a master information block MIB or a system information block SIB.

With reference to any one of the third aspect or the possible embodiments of the third aspect, in a thirteenth possible embodiment, when sending the indication information to the terminal device (UE) that initiates a request in the first cell to access the NB-IoT, the sending unit is configured to:

after allocating a physical random access channel PRACH to the UE, notify the UE by adding the indication information to random access channel (RACH) response information or higher layer signaling.

According to a fourth aspect, an apparatus for obtaining an uplink-downlink carrier frequency spacing is provided, where the apparatus is applied to an NB-IoT system, and includes:

a receiving unit, configured to: initiate a request in a first cell to access an NB-IoT, and receive an indication message sent by a base station, where the indication message is used to indicate an uplink-downlink carrier frequency spacing corresponding to the first cell; and an analysis unit, configured to determine, according to the indication information, the uplink-downlink carrier frequency spacing corresponding to the first cell.

With reference to the fourth aspect, in a first possible embodiment of the fourth aspect, when receiving the indication message sent by the base station, the receiving unit is configured to:

after performing network synchronization with the base station by using a PSS and an SSS that are corresponding to the first cell, parse the indication information carried in a newly added message of $\log_2(L+K)-\log_2(L)$ bits, where a total quantity of sequences included in a candidate sequence set of the PSS and the SSS is extended from L to L+K, and L and K are positive integers.

With reference to the fourth aspect, in a second possible embodiment of the fourth aspect, when receiving the indication message sent by the base station, the receiving unit is configured to:

after completing network synchronization with the base station, receive broadcast information that is sent by the base station and that carries the indication message.

With reference to the fourth aspect, in a third possible embodiment of the fourth aspect, the broadcast message that carries the indication message carries the indication message in a master information block MIB or a system information block SIB.

With reference to any one of the fourth aspect or the possible embodiments of the fourth aspect, in a fourth possible embodiment, when receiving the indication message sent by the base station, the receiving unit is configured to:

receive a broadcast message that is sent by the base station and that does not carry the indication message, and obtain random access channel PRACH information by using the broadcast information that does not carry the indication message;

send a random access message to the base station according to the PRACH information; and receive RACH response information or higher layer signaling sent by the base station, where the RACH response information carries the indication message, or the higher layer signaling carries the indication message.

With reference to any one of the fourth aspect or the possible embodiments of the fourth aspect, in a fifth possible embodiment, when determining, according to the indication information, the uplink-downlink carrier frequency spacing corresponding to the first cell, the analysis unit is configured to:

when determining that the indication information carries an uplink-downlink basic carrier frequency spacing corresponding to a frequency band used by the first cell, an index number corresponding to the first carrier frequency deviation in a first carrier frequency deviation set, and a difference between index numbers of uplink and downlink physical resource blocks used by the first cell, determine the first carrier frequency deviation according to the index number corresponding to the first carrier frequency deviation in the first carrier frequency deviation set; and calculate a sum of the first carrier frequency deviation, the basic carrier frequency spacing, and a product of physical resource block bandwidth and the difference between the index numbers of the uplink and downlink physical resource blocks, to obtain the uplink-downlink carrier frequency spacing of the first cell, where the first carrier frequency deviation set includes all possible carrier frequency deviations and index numbers corresponding to all the carrier frequency deviations, or includes all possible in-band carrier frequency deviations and index numbers corresponding to all the in-band carrier frequency deviations.

With reference to any one of the fourth aspect or the possible embodiments of the fourth aspect, in a sixth possible embodiment, when determining, according to the indication information, the uplink-downlink carrier frequency spacing corresponding to the first cell, the analysis unit is configured to:

when determining that the indication information carries an uplink-downlink basic carrier frequency spacing corresponding to a frequency band used by the first cell, an index number corresponding to the second carrier frequency deviation in a second carrier frequency deviation set, and a subcarrier quantity deviation corresponding to the first cell, determine the second carrier frequency deviation according to the index number corresponding to the second carrier frequency deviation in the second carrier frequency deviation set; and calculate a sum of the basic carrier frequency spacing, the second carrier frequency deviation, and a product of the subcarrier quantity deviation and subcarrier bandwidth, to obtain the uplink-downlink carrier frequency spacing of the first cell, where the second carrier frequency deviation set includes all possible carrier frequency deviations and index numbers corresponding to all the carrier frequency deviations, or includes all possible guard band carrier frequency deviations and index numbers corresponding to all the guard band carrier frequency deviations.

With reference to any one of the fourth aspect or the possible embodiments of the fourth aspect, in a seventh possible embodiment, when determining, according to the indication information, the uplink-downlink carrier frequency spacing corresponding to the first cell, the analysis unit is configured to:

when determining that the indication information carries the uplink-downlink carrier frequency spacing of the first cell, directly obtain the uplink-downlink carrier frequency spacing of the first cell.

With reference to any one of the fourth aspect or the possible embodiments of the fourth aspect, in an eighth possible embodiment, when determining, according to the indication information, the uplink-downlink carrier frequency spacing corresponding to the first cell, the analysis unit is configured to:

determine that the indication information carries an index number corresponding to the uplink-downlink carrier frequency spacing of the first cell in a preset carrier frequency spacing set; and determine the uplink-downlink carrier frequency spacing of the first cell according to the index number corresponding to the uplink-downlink carrier frequency spacing of the first cell in the preset carrier frequency spacing set, where if an NB-IoT operation mode preset by the first cell is an in-band operation mode, the preset carrier frequency spacing set includes all possible carrier frequency spacings and index numbers corresponding to all the carrier frequency spacings, or includes all possible in-band carrier frequency deviations and index numbers corresponding to all the in-band carrier frequency deviations; or if an NB-IoT operation mode preset by the first cell is identified as a guard band operation mode, the preset carrier frequency spacing set includes all possible carrier frequency spacings and index numbers corresponding to all the carrier frequency spacings, or includes all possible guard band carrier frequency deviations and index numbers corresponding to all the guard band carrier frequency deviations.

With reference to any one of the fourth aspect or the possible embodiments of the fourth aspect, in a ninth possible embodiment, when determining, according to the indication information, the uplink-downlink carrier frequency spacing corresponding to the first cell, the analysis unit is configured to:

determine that the indication information carries an uplink center frequency corresponding to the first cell, and use the uplink center frequency for access.

With reference to any one of the fourth aspect or the possible embodiments of the fourth aspect, in a tenth possible embodiment, when determining, according to the indication information, the uplink-downlink carrier frequency spacing corresponding to the first cell, the analysis unit is configured to:

determine that the indication information carries index numbers of uplink and downlink physical resource blocks corresponding to the first cell, and determine a corresponding index number of an LTE uplink physical resource block according to the index number of the downlink physical resource block corresponding to the first cell; and determine, according to the index number of the LTE uplink physical resource block and the index number of the uplink physical resource block corresponding to the first cell, a first carrier frequency deviation corresponding to the first cell and an uplink-downlink basic carrier frequency spacing corresponding to a frequency band used by the first cell, and calculate a sum of the first carrier frequency deviation and the basic carrier frequency spacing to obtain the uplink-downlink carrier frequency spacing of the first cell.

The present invention has the following beneficial effects: The base station obtains the determining parameter used to determine the uplink-downlink carrier frequency spacing of the first cell, and generates the indication information according to the determining parameter. According to the NB-IoT operation mode preset by the first cell and various different application scenario requirements, different indication information content may be determined, and multiple types of indication information may be generated. Therefore, flexibility and diversity of indicating the uplink-downlink carrier frequency spacing of the first cell by the base station are improved. The indication message is used to indicate the uplink-downlink carrier frequency spacing of the first cell. The base station sends the indication information to the terminal device (UE) that initiates a request in the first cell to access the NB-IoT. The indication information may be sent on different occasions according to a requirement, and therefore flexibility of indicating the uplink-downlink carrier frequency spacing of the first cell by the base station is improved.

The UE initiates a request in the first cell to access the NB-IoT, and receives the indication message sent by the base station, where the indication message is used to indicate the uplink-downlink carrier frequency spacing corresponding to the first cell. The UE receives the indication information on different occasions, and the UE determines, according to the indication information, the uplink-downlink carrier frequency spacing corresponding to the first cell. The uplink-downlink carrier frequency spacing corresponding to the first cell is parsed herein according to different types of indication information, so that the terminal implements access at a correct NB-IoT uplink carrier frequency.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Embodiments of the present invention provide a method and an apparatus for indicating an uplink-downlink carrier frequency spacing, and a method and an apparatus for obtaining an uplink-downlink carrier frequency spacing, so that a terminal obtains a correct NB-IoT uplink carrier frequency. The methods and the apparatuses are based on a same inventive concept. Because a problem-solving principle of the methods is similar to that of the apparatuses, mutual reference may be made to embodiments of the apparatuses and the methods, and no repeated description is provided.

The following describes preferred embodiments of the present invention in detail with reference to the accompanying drawings.

Figure 1:
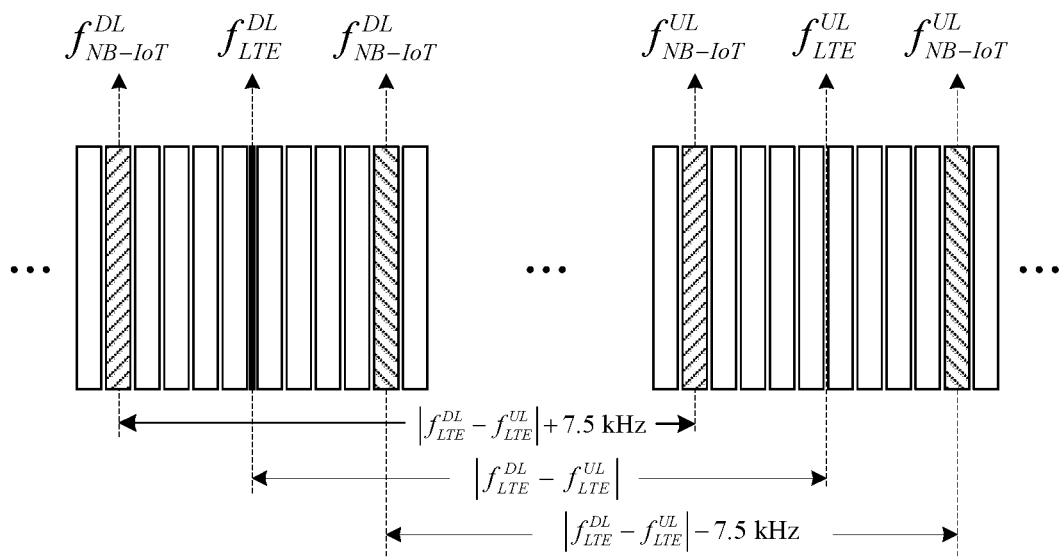
FIG. 1 is a schematic diagram of an NB-IoT in-band operation according to an embodiment of the present invention.
Figure 2:
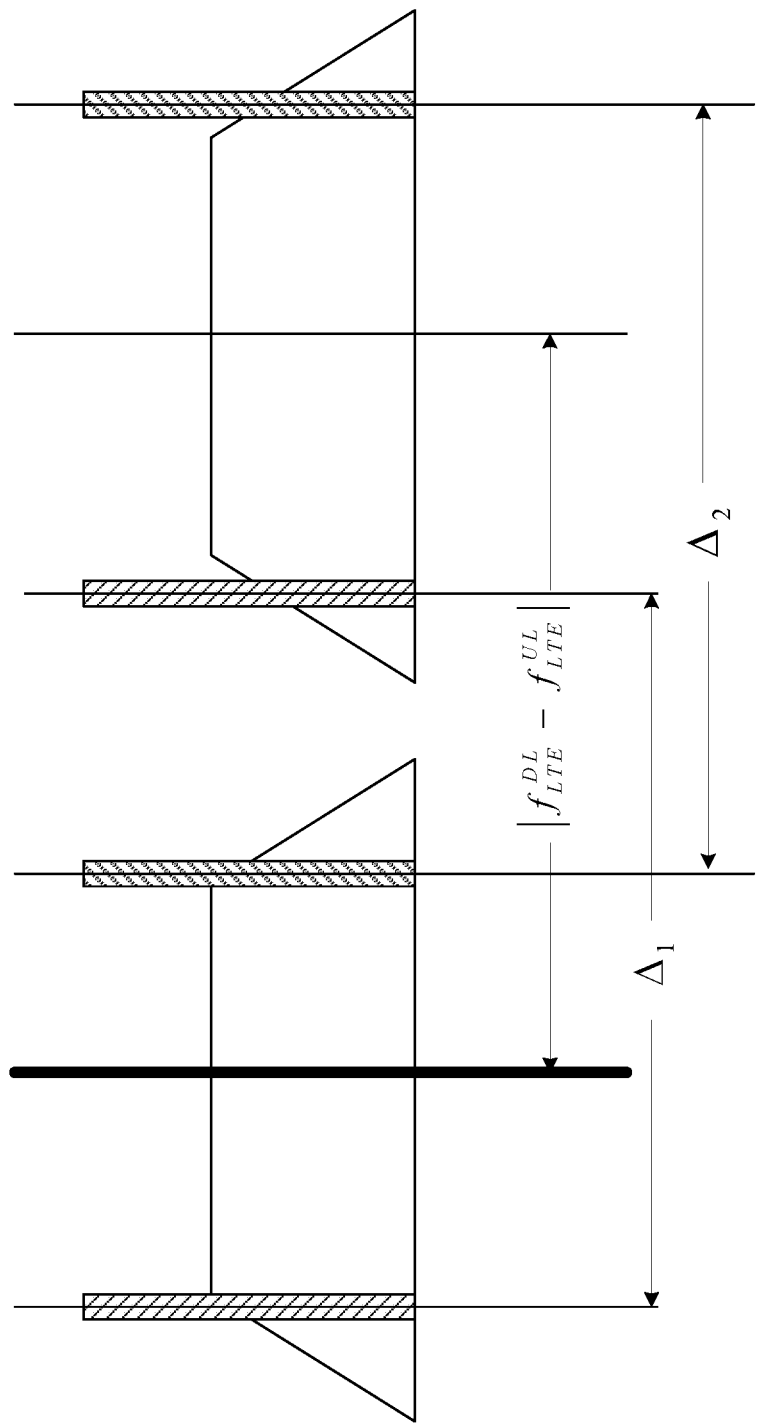
FIG. 2 is a schematic diagram of an NB-IoT guard band operation according to an embodiment of the present invention.
Figure 3:
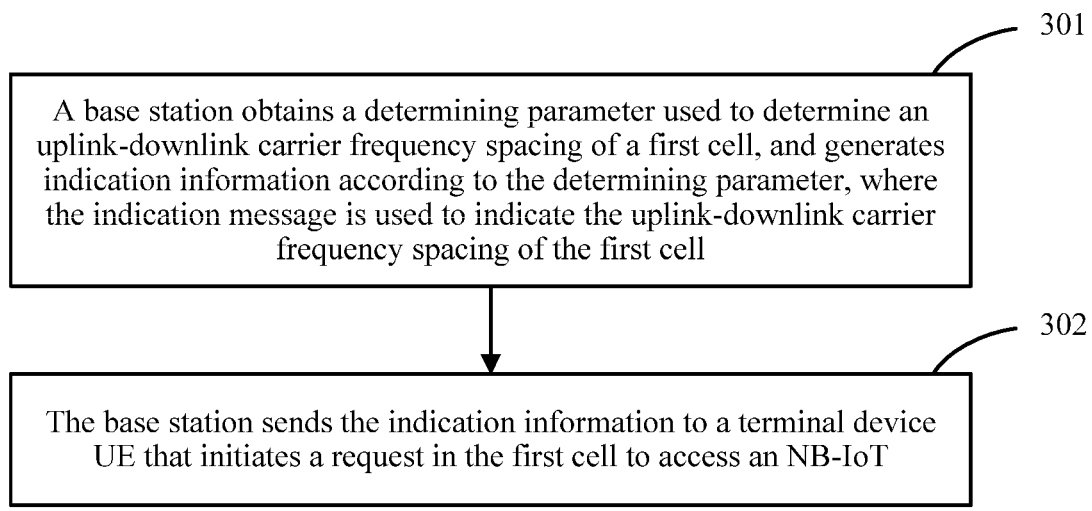
FIG. 3 is an overall flowchart of indicating an uplink-downlink carrier frequency spacing according to an embodiment of the present invention.

Referring to FIG. 3, an embodiment of the present invention provides a method for indicating an uplink-downlink carrier frequency spacing. The method is applied to a Narrowband Internet of Things (NB-IoT) system. The method includes the following steps.

Step 301: A base station obtains a determining parameter used to determine an uplink-downlink carrier frequency spacing of a first cell, and generates indication information according to the determining parameter, where the indication message is used to indicate the uplink-downlink carrier frequency spacing of the first cell.

Step 302: The base station sends the indication information to a terminal device (UE) that initiates a request in the first cell to access an NB-IoT.

For step 301, when the base station obtains the determining parameter used to determine the uplink-downlink carrier frequency spacing of the first cell, and generates the indication information according to the determining parameter, the following specific cases are included:

In a first case, when the base station determines that an NB-IoT operation mode preset by the first cell is an in-band operation mode, the determining parameter that is obtained by the base station and that is used to determine the uplink-downlink carrier frequency spacing of the first cell includes: a first carrier frequency deviation that is corresponding to the first cell and that is determined according to a frequency band used by the first cell, an uplink-downlink basic carrier frequency spacing corresponding to the frequency band used by the first cell, and a difference between index numbers of uplink and downlink physical resource blocks used by the first cell.

For example, the base station determines that a frequency band used by a cell A is an LTE operating frequency band 1, and therefore the base station determines, according to the frequency band used by the cell A, that an uplink-downlink basic carrier frequency spacing corresponding to the cell A is 190 MHz; the cell is located on a left side of an LTE center frequency, and therefore a first carrier frequency deviation of the cell A is −7.5 kHz; and both index numbers of uplink and downlink physical resource blocks of the cell A are 1, and therefore a difference between the index numbers of the uplink and downlink physical resource blocks of the cell A is 0.

How to determine the first carrier frequency deviation is described herein merely for a case in which an intermediate subcarrier of 15 kHz in an LTE downlink carrier frequency serves as a DC and is not used. The method in the present invention may be further applied to another application scenario in which a carrier frequency spacing needs to be prompted.

In this case, that a base station generates indication information according to the determining parameter is:

generating, by the base station, indication information that carries the uplink-downlink basic carrier frequency spacing corresponding to the frequency band used by the first cell, an index number corresponding to the first carrier frequency deviation in a first carrier frequency deviation set, and the difference between the index numbers of the uplink and downlink physical resource blocks used by the first cell.

The first carrier frequency deviation set includes all possible carrier frequency deviations and index numbers corresponding to all the carrier frequency deviations, that is, an entire carrier frequency deviation whole set and the index numbers corresponding to all the carrier frequency deviations, or includes all possible in-band carrier frequency deviations and index numbers corresponding to all the in-band carrier frequency deviations, that is, a subset of an entire carrier frequency deviation whole set, including only the in-band carrier frequency deviations and the index numbers corresponding to all the in-band carrier frequency deviations.

In a second case, when the base station determines that an NB-IoT operation mode preset by the first cell is a guard band operation mode, the determining parameter that is obtained by the base station and that is used to determine the uplink-downlink carrier frequency spacing of the first cell includes: a second carrier frequency deviation that is corresponding to the first cell and that is determined according to a frequency band used by the first cell, an uplink-downlink basic carrier frequency spacing corresponding to the frequency band used by the first cell, and a subcarrier quantity deviation corresponding to the first cell.

For example, the base station determines that a frequency band used by a cell 1 is the LTE operating frequency band 1, and therefore the base station determines, according to the frequency band used by the cell 1, that an uplink-downlink basic carrier frequency spacing corresponding to the cell 1 is 190 MHz; the cell is located on a left side of the LTE center frequency, and therefore a second carrier frequency deviation of the cell 1 is −7.5 kHz; and an uplink subcarrier of the cell 1 and an LTE resource block are separated by two subcarriers, a downlink subcarrier and an LTE resource block are separated by one subcarrier, and therefore a subcarrier quantity deviation is 1.

In this case, that a base station generates indication information according to the determining parameter is:

generating, by the base station, indication information that carries the uplink-downlink basic carrier frequency spacing corresponding to the frequency band used by the first cell, an index number corresponding to the second carrier frequency deviation in a second carrier frequency deviation set, and the subcarrier quantity deviation corresponding to the first cell.

The second carrier frequency deviation set includes all possible carrier frequency deviations and index numbers corresponding to all the carrier frequency deviations, that is, an entire carrier frequency deviation whole set and the index numbers corresponding to all the carrier frequency deviations, or includes all possible guard band carrier frequency deviations and index numbers corresponding to all the guard band carrier frequency deviations, that is, another subset of an entire carrier frequency deviation whole set, including only the guard band carrier frequency deviations and the index numbers corresponding to all the guard band carrier frequency deviations.

In a third case, the base station determines the uplink-downlink carrier frequency spacing of the first cell according to the determining parameter, and that a base station generates indication information according to the uplink-downlink carrier frequency spacing of the first cell is:

generating, by the base station, indication information that carries the uplink-downlink carrier frequency spacing of the first cell, or generating, by the base station, indication information that carries an index number corresponding to the uplink-downlink carrier frequency spacing of the first cell in a preset carrier frequency spacing set and an identifier of an NB-IoT operation mode preset by the first cell.

If the NB-IoT operation mode preset by the first cell is an in-band operation mode, the preset carrier frequency spacing set includes all possible carrier frequency spacings and index numbers corresponding to all the carrier frequency spacings, or includes all possible in-band carrier frequency deviations and index numbers corresponding to all the in-band carrier frequency deviations.

If the NB-IoT operation mode preset by the first cell is a guard band operation mode, the preset carrier frequency spacing set includes all possible carrier frequency spacings and index numbers corresponding to all the carrier frequency spacings, or includes all possible guard band carrier frequency deviations and index numbers corresponding to all the guard band carrier frequency deviations.

In addition, the base station may further generate the indication information that carries the index number corresponding to the uplink-downlink carrier frequency spacing of the first cell in the preset carrier frequency spacing set and the identifier of the NB-IoT operation mode preset by the first cell. The NB-IoT operation mode preset by the first cell may be notified to the UE after being carried in the indication message, or the NB-IoT operation mode preset by the first cell may be notified to the UE in another manner.

That the base station determines the uplink-downlink carrier frequency spacing of the first cell according to the determining parameter includes at least the following cases:

(1) When the base station determines that the NB-IoT operation mode preset by the first cell is the in-band operation mode, the base station calculates, according to the determining parameter, a sum of a first carrier frequency deviation, an uplink-downlink basic carrier frequency spacing corresponding to a frequency band used by the first cell, and a product of physical resource block bandwidth and a difference between index numbers of uplink and downlink physical resource blocks, to obtain the uplink-downlink carrier frequency spacing of the first cell.

For example, the cell A is still used as an example. The uplink-downlink basic carrier frequency spacing corresponding to the frequency band used by the cell A is 190 MHz, the first carrier frequency deviation of the cell A is −7.5 kHz, the difference between the index numbers of the uplink and downlink physical resource blocks of the cell A is 0, and therefore it may be learned that an uplink-downlink carrier frequency spacing of the cell A is:

190−7.5=182.5 (kHz).

For another example, a frequency band used by a cell B is the LTE operating frequency band 1, and therefore an uplink-downlink basic carrier frequency spacing corresponding to the frequency band used by the cell B is also 190 MHz; the cell B is located on a right side of the LTE center frequency, and in this case, a first carrier frequency deviation of the cell B is +7.5 kHz; an index number of an uplink physical resource of the cell B is 49, an index number of a downlink physical resource of the cell B is 50, and therefore a difference between the index numbers of the uplink and downlink physical resource blocks of the cell B is 1; and physical resource block bandwidth is 180 kHz. Therefore, it may be learned that an uplink-downlink carrier frequency spacing of the cell B is:

190+7.5+1*180=377.5 (kHz).

For another example, a frequency band used by a cell C is the LTE operating frequency band 1, and therefore an uplink-downlink basic carrier frequency spacing corresponding to the frequency band used by the cell C is also 190 MHz; the cell C is located on a left side of the LTE center frequency, and in this case, a first carrier frequency deviation of the cell C is −7.5 kHz; an index number of an uplink physical resource of the cell C is 1, an index number of a downlink physical resource of the cell C is 3, and therefore a difference between the index numbers of the uplink and downlink physical resource blocks of the cell C is 2; and physical resource block bandwidth is 180 kHz. Therefore, it may be learned that an uplink-downlink carrier frequency spacing of the cell C is:

190−7.5+2*180=542.5 (kHz).

(2) When the base station determines that the NB-IoT operation mode preset by the first cell is the guard band operation mode, the base station calculates, according to the determining parameter, a sum of an uplink-downlink basic carrier frequency spacing corresponding to a frequency band used by the first cell, a second carrier frequency deviation, and a product of a subcarrier quantity deviation and subcarrier bandwidth, to obtain the uplink-downlink carrier frequency spacing of the first cell.

For example, the cell 1 is still used as an example. The uplink-downlink basic carrier frequency spacing corresponding to the frequency band used by the cell 1 is 190 MHz; the cell is located on the left side of the LTE center frequency, and therefore a second carrier frequency deviation of the cell 1 is −7.5 kHz; a subcarrier quantity deviation of the cell 1 is 1, and subcarrier bandwidth is 15 kHz. Therefore, it may be learned that an uplink-downlink carrier frequency spacing of the cell is:

190−7.5+1*15=197.5 (kHz).

For another example, an uplink-downlink basic carrier frequency spacing corresponding to a frequency band used by a cell 2 is 190 MHz; the cell is located on a right side of the LTE center frequency, and therefore a second carrier frequency deviation of the cell 2 is +7.5 kHz; an uplink subcarrier of the cell 2 and an LTE resource block are separated by two subcarriers, a downlink subcarrier and an LTE resource block are separated by one subcarrier, and therefore a subcarrier quantity deviation of the cell 2 is −1; and subcarrier bandwidth is 15 kHz. Therefore, it may be learned that an uplink-downlink carrier frequency spacing of the cell is:

190+7.5−1*15=182.5 (kHz).

In a fourth case, the determining parameter that is obtained by the base station and that is used to determine the uplink-downlink carrier frequency spacing of the first cell includes an uplink center frequency corresponding to the first cell.

In this case, that a base station generates indication information according to the determining parameter includes:

generating, by the base station, indication information that carries the uplink center frequency corresponding to the first cell.

In this case, the base station has determined the uplink-downlink carrier frequency spacing of the first cell, and directly calculates, according to the uplink-downlink carrier frequency spacing, the uplink center frequency that needs to be used during access of the UE.

In a fifth case, the determining parameter that is obtained by the base station and that is used to determine the uplink-downlink carrier frequency spacing of the first cell includes index numbers of uplink and downlink physical resource blocks corresponding to the first cell.

In this case, that a base station generates indication information according to the determining parameter includes:

generating, by the base station, indication information that carries the index numbers of the uplink and downlink physical resource blocks corresponding to the first cell.

For step 302, that the base station sends the indication information to a terminal device (UE) that initiates a request in the first cell to access an NB-IoT includes at least the following three cases:

In a first case, the base station determines a total quantity L of sequences included in a candidate sequence set of a primary synchronization signal (PSS) and a secondary synchronization signal (SSS), and extends the total quantity of sequences included in the candidate sequence set from L to L+K, where information that can be indicated by each sequence is increased from $\log_2(L)$ bits to $\log_2(L+K)$ bits; and after performing network synchronization with the UE by using the PSS and the SSS that are corresponding to the first cell, the base station notifies the UE by adding the indication information to a newly added message of $\log_2(L+K)-\log_2(L)$ bits.

For example, it is assumed that an original total quantity of sequences included in the candidate sequence set is 8, and is extended to 32 now. In this way, two bits are added, that is, $\log_2(32)-\log_2(8)$, where L=8, and K=24.

A specific indication method is that the original eight candidate sequences are used to represent cell IDs numbered from 0 to 7. The total quantity of sequences is increased to 32 now, and the sequences may be divided into four groups, and each group includes eight sequences. A group number i is corresponding to an index number i of a first carrier frequency deviation in a preset carrier frequency deviation set, or an index number i of a second carrier frequency deviation in a preset carrier frequency deviation set. A $j^{th}$ candidate sequence in a group still represents that an original cell ID is j.

Likewise, more sequences may be further added, and more precise grouping may be performed to indicate more information.

In a second case, after the base station completes network synchronization with the UE, the base station notifies the UE by adding the indication information to broadcast information.

The broadcast message that carries the indication message carries the indication message in a master information block (MIB) or a system information block (SIB).

In a third case, that the base station sends the indication information to a terminal device (UE) that initiates a request in the first cell to access an NB-IoT includes:

after the base station allocates a physical random access channel PRACH to the UE, the base station notifies the UE by adding the indication information to random access channel (RACH) response information or higher layer signaling.

The higher layer signaling herein may be radio resource control (RRC) signaling.

Figure 4:
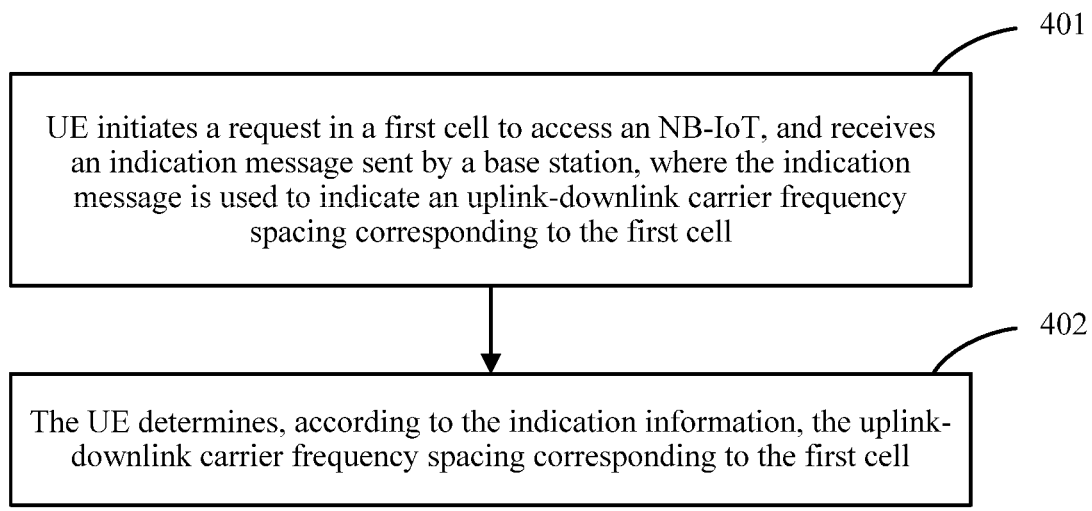
FIG. 4 is an overall flowchart of obtaining an uplink-downlink carrier frequency spacing according to an embodiment of the present invention.

Referring to FIG. 4, an embodiment of the present invention provides a method for obtaining an uplink-downlink carrier frequency spacing. The method is applied to an NB-IoT system, and includes the following steps.

Step 401: UE initiates a request in a first cell to access an NB-IoT, and receives an indication message sent by a base station, where the indication message is used to indicate an uplink-downlink carrier frequency spacing corresponding to the first cell.

Step 402: The UE determines, according to the indication information, the uplink-downlink carrier frequency spacing corresponding to the first cell.

For step 401, that UE receives an indication message sent by a base station includes at least the following three manners:

In a first manner, after the UE performs network synchronization with the base station by using a PSS and an SSS that are corresponding to the first cell, the UE parses the indication information carried in a newly added message of $\log_2(L+K)-\log_2(L)$ bits.

A total quantity of sequences included in a candidate sequence set of the PSS and the SSS is extended from L to L+K.

For example, the UE parses a group number of a sequence and a number of a sequence in a group herein. A group number 1 of a sequence is corresponding to an index number 1 of a first carrier frequency deviation in a preset carrier frequency deviation set, and a number 3 of a sequence in a group represents that an original cell ID is 3.

Likewise, when the total quantity of sequences is further increased, the UE may obtain more information by means of parsing.

In a second manner, after the UE completes network synchronization with the base station, the UE receives broadcast information that is sent by the base station and that carries the indication message.

The broadcast message that carries the indication message carries the indication message in a MIB or a SIB.

In a third manner, the UE receives a broadcast message that is sent by the base station and that does not carry the indication message, and obtains PRACH information by using the broadcast information that does not carry the indication message, and the UE sends a random access message to the base station according to the PRACH information, and receives RACH response information or higher layer signaling sent by the base station, where the RACH response information carries the indication message, or the higher layer signaling carries the indication message.

For step 402, that the UE determines, according to the indication information, the uplink-downlink carrier frequency spacing corresponding to the first cell includes at least the following possible cases:

In a first case, when the UE determines that the indication information carries an uplink-downlink basic carrier frequency spacing corresponding to a frequency band used by the first cell, an index number corresponding to a first carrier frequency deviation in a first carrier frequency deviation set, and a difference between index numbers of uplink and downlink physical resource blocks used by the first cell, the UE determines the first carrier frequency deviation according to the index number corresponding to the first carrier frequency deviation in the first carrier frequency deviation set; and the UE calculates a sum of the first carrier frequency deviation, the basic carrier frequency spacing, and a product of physical resource block bandwidth and the difference between the index numbers of the uplink and downlink physical resource blocks, to obtain the uplink-downlink carrier frequency spacing of the first cell.

The first carrier frequency deviation set includes all possible carrier frequency deviations and index numbers corresponding to all the carrier frequency deviations, or includes all possible in-band carrier frequency deviations and index numbers corresponding to all the in-band carrier frequency deviations.

A method herein for determining the uplink-downlink carrier frequency spacing of the first cell is the same as the method for determining, by the base station, the uplink-downlink carrier frequency spacing of the first cell according to the determining parameter. Details are not described herein, and reference may be made to the foregoing embodiment.

In a second case, when the UE determines that the indication information carries an uplink-downlink basic carrier frequency spacing corresponding to a frequency band used by the first cell, an index number corresponding to a second carrier frequency deviation in a second carrier frequency deviation set, and a subcarrier quantity deviation corresponding to the first cell, the UE determines the second carrier frequency deviation according to the index number corresponding to the second carrier frequency deviation in the second carrier frequency deviation set; and the UE calculates a sum of the basic carrier frequency spacing, the second carrier frequency deviation, and a product of the subcarrier quantity deviation and subcarrier bandwidth, to obtain the uplink-downlink carrier frequency spacing of the first cell.

The second carrier frequency deviation set includes all possible carrier frequency deviations and index numbers corresponding to all the carrier frequency deviations, or includes all possible guard band carrier frequency deviations and index numbers corresponding to all the guard band carrier frequency deviations.

Likewise, a method herein for determining the uplink-downlink carrier frequency spacing of the first cell is the same as the method for determining, by the base station, the uplink-downlink carrier frequency spacing of the first cell according to the determining parameter. Details are not described herein, and reference may be made to the foregoing embodiment.

In a third case, when the UE determines that the indication information carries the uplink-downlink carrier frequency spacing of the first cell, the UE directly obtains the uplink-downlink carrier frequency spacing of the first cell.

In a fourth case, the UE determines that the indication information carries an index number corresponding to the uplink-downlink carrier frequency spacing of the first cell in a preset carrier frequency spacing set.

Two cases are included herein:

(1) If the UE determines that an NB-IoT operation mode preset by the first cell is an in-band operation mode, the UE determines the uplink-downlink carrier frequency spacing of the first cell according to the index number corresponding to the uplink-downlink carrier frequency spacing of the first cell in the preset carrier frequency spacing set.

If the NB-IoT operation mode preset by the first cell is identified as the in-band operation mode, the preset carrier frequency spacing set includes all possible carrier frequency spacings and index numbers corresponding to all the carrier frequency spacings, or includes all possible in-band carrier frequency deviations and index numbers corresponding to all the in-band carrier frequency deviations.

(2) If the UE determines that an NB-IoT operation mode preset by the first cell is a guard band operation mode, the UE determines the uplink-downlink carrier frequency spacing of the first cell according to the index number corresponding to the uplink-downlink carrier frequency spacing of the first cell in the preset carrier frequency spacing set.

If the NB-IoT operation mode preset by the first cell is identified as the guard band operation mode, the preset carrier frequency spacing set includes all possible carrier frequency spacings and index numbers corresponding to all the carrier frequency spacings, or includes all possible guard band carrier frequency deviations and index numbers corresponding to all the guard band carrier frequency deviations.

The NB-IoT operation mode herein may be notified by the base station to the UE after the base station adds an identifier of the NB-IoT operation mode to the indication message or another message, or may be obtained in another manner. This is not limited herein.

In a fifth case, the UE determines that the indication information carries an uplink center frequency corresponding to the first cell; and the UE uses the uplink center frequency for access.

In a sixth case, the UE determines that the indication information carries index numbers of uplink and downlink physical resource blocks corresponding to the first cell; and the UE determines a corresponding index number of an LTE uplink physical resource block according to the index number of the downlink physical resource block corresponding to the first cell, determines, according to the index number of the LTE uplink physical resource block and the index number of the uplink physical resource block corresponding to the first cell, a first carrier frequency deviation corresponding to the first cell and an uplink-downlink basic carrier frequency spacing corresponding to a frequency band used by the first cell, and calculates a sum of the first carrier frequency deviation and the basic carrier frequency spacing to obtain the uplink-downlink carrier frequency spacing of the first cell; or directly determines, according to the index number of the LTE uplink physical resource block and the index number of the uplink physical resource block corresponding to the first cell, an uplink center frequency corresponding to the first cell.

Figure 5:
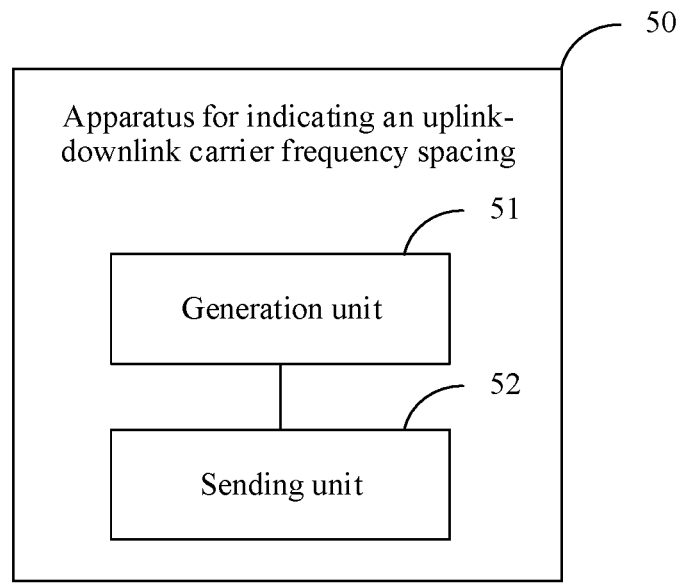
FIG. 5 is a schematic structural diagram of an apparatus for indicating an uplink-downlink carrier frequency spacing according to an embodiment of the present invention.

Referring to FIG. 5, an embodiment of the present invention provides an apparatus 50 for indicating an uplink-downlink carrier frequency spacing. The apparatus is applied to a Narrowband Internet of Things NB-IoT system, and includes:

a generation unit 51, configured to: obtain a determining parameter used to determine an uplink-downlink carrier frequency spacing of a first cell, and generate indication information according to the determining parameter, where the indication message is used to indicate the uplink-downlink carrier frequency spacing of the first cell; and a sending unit 52, configured to send the indication information to a terminal device (UE) that initiates a request in the first cell to access an NB-IoT.

Optionally, when the generation unit 51 determines that an NB-IoT operation mode preset by the first cell is an in-band operation mode, the obtained determining parameter used to determine the uplink-downlink carrier frequency spacing of the first cell includes: a first carrier frequency deviation that is corresponding to the first cell and that is determined according to a frequency band used by the first cell, an uplink-downlink basic carrier frequency spacing corresponding to the frequency band used by the first cell, and a difference between index numbers of uplink and downlink physical resource blocks used by the first cell.

Optionally, when generating the indication information according to the determining parameter, the generation unit 51 is configured to:

generate indication information that carries the uplink-downlink basic carrier frequency spacing corresponding to the frequency band used by the first cell, an index number corresponding to the first carrier frequency deviation in a first carrier frequency deviation set, and the difference between the index numbers of the uplink and downlink physical resource blocks used by the first cell, where the first carrier frequency deviation set includes all possible carrier frequency deviations and index numbers corresponding to all the carrier frequency deviations, or includes all possible in-band carrier frequency deviations and index numbers corresponding to all the in-band carrier frequency deviations.

Optionally, when the generation unit 51 determines that an NB-IoT operation mode preset by the first cell is a guard band operation mode, the obtained determining parameter used to determine the uplink-downlink carrier frequency spacing of the first cell includes: a second carrier frequency deviation that is corresponding to the first cell and that is determined according to a frequency band used by the first cell, an uplink-downlink basic carrier frequency spacing corresponding to the frequency band used by the first cell, and a subcarrier quantity deviation corresponding to the first cell.

Optionally, when generating the indication information according to the determining parameter, the generation unit 51 is configured to:

generate indication information that carries the uplink-downlink basic carrier frequency spacing corresponding to the frequency band used by the first cell, an index number corresponding to the second carrier frequency deviation in a second carrier frequency deviation set, and the subcarrier quantity deviation corresponding to the first cell, where the second carrier frequency deviation set includes all possible carrier frequency deviations and index numbers corresponding to all the carrier frequency deviations, or includes all possible guard band carrier frequency deviations and index numbers corresponding to all the guard band carrier frequency deviations.

Optionally, when generating the indication information according to the determining parameter, the generation unit 51 is configured to:

determine the uplink-downlink carrier frequency spacing of the first cell according to the determining parameter; and generate indication information that carries the uplink-downlink carrier frequency spacing of the first cell, or generate indication information that carries an index number corresponding to the uplink-downlink carrier frequency spacing of the first cell in a preset carrier frequency spacing set, where if an NB-IoT operation mode preset by the first cell is an in-band operation mode, the preset carrier frequency spacing set includes all possible carrier frequency spacings and index numbers corresponding to all the carrier frequency spacings, or includes all possible in-band carrier frequency deviations and index numbers corresponding to all the in-band carrier frequency deviations; or if an NB-IoT operation mode preset by the first cell is a guard band operation mode, the preset carrier frequency spacing set includes all possible carrier frequency spacings and index numbers corresponding to all the carrier frequency spacings, or includes all possible guard band carrier frequency deviations and index numbers corresponding to all the guard band carrier frequency deviations.

Optionally, when determining the uplink-downlink carrier frequency spacing of the first cell according to the determining parameter, the generation unit 51 is configured to:

when determining that the NB-IoT operation mode preset by the first cell is the in-band operation mode, calculate, according to the determining parameter, a sum of a first carrier frequency deviation, an uplink-downlink basic carrier frequency spacing corresponding to a frequency band used by the first cell, and a product of physical resource block bandwidth and a difference between index numbers of uplink and downlink physical resource blocks, to obtain the uplink-downlink carrier frequency spacing of the first cell.

Optionally, when determining the uplink-downlink carrier frequency spacing of the first cell according to the determining parameter, the generation unit 51 is configured to:

when the base station determines that the NB-IoT operation mode preset by the first cell is the guard band operation mode, calculate, according to the determining parameter, a sum of an uplink-downlink basic carrier frequency spacing corresponding to a frequency band used by the first cell, a second carrier frequency deviation, and a product of a subcarrier quantity deviation and subcarrier bandwidth, to obtain the uplink-downlink carrier frequency spacing of the first cell.

Optionally, the determining parameter that is obtained by the generation unit 51 and that is used to determine the uplink-downlink carrier frequency spacing of the first cell includes an uplink center frequency corresponding to the first cell; and the generating indication information according to the determining parameter includes:

generating indication information that carries the uplink center frequency corresponding to the first cell.

Optionally, the determining parameter that is obtained by the generation unit 51 and that is used to determine the uplink-downlink carrier frequency spacing of the first cell includes index numbers of uplink and downlink physical resource blocks corresponding to the first cell; and the generating indication information according to the determining parameter includes:

generating indication information that carries the index numbers of the uplink and downlink physical resource blocks corresponding to the first cell.

Optionally, when sending the indication information to the terminal device (UE) that initiates a request in the first cell to access the NB-IoT, the sending unit 52 is configured to:

determine a total quantity L of sequences included in a candidate sequence set of a primary synchronization signal (PSS) and a secondary synchronization signal (SSS), and extend the total quantity of sequences included in the candidate sequence set from L to L+K, where information that can be indicated by each sequence is increased from $\log_2(L)$ bits to $\log_2(L+K)$ bits, and L and K are positive integers; and after performing network synchronization with the UE by using the PSS and the SSS that are corresponding to the first cell, notify the UE by adding the indication information to a newly added message of $\log_2(L+K)-\log_2(L)$ bitsbits.

Optionally, when sending the indication information to the terminal device (UE) that initiates a request in the first cell to access the NB-IoT, the sending unit 52 is configured to:

after completing network synchronization with the UE, notify the UE by using broadcast information that carries the indication information.

Optionally, the broadcast message that carries the indication message carries the indication message in a master information block MIB or a system information block SIB.

Optionally, when sending the indication information to the terminal device (UE) that initiates a request in the first cell to access the NB-IoT, the sending unit 52 is configured to:

after allocating a physical random access channel PRACH to the UE, notify the UE by adding the indication information to random access channel (RACH) response information or higher layer signaling.

Figure 6:
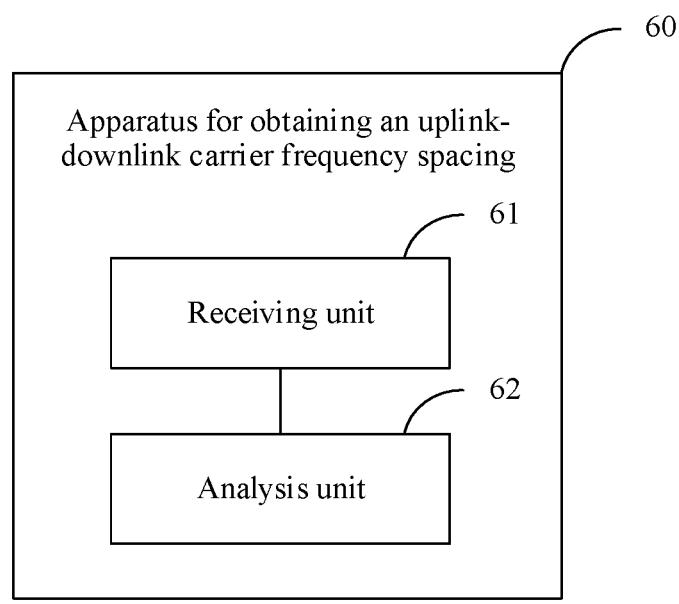
FIG. 6 is a schematic structural diagram of an apparatus for obtaining an uplink-downlink carrier frequency spacing according to an embodiment of the present invention.

Referring to FIG. 6, an embodiment of the present invention provides an apparatus 60 for obtaining an uplink-downlink carrier frequency spacing. The apparatus is applied to an NB-IoT system, and includes:

a receiving unit 61, configured to: initiate a request in a first cell to access an NB-IoT, and receive an indication message sent by a base station, where the indication message is used to indicate an uplink-downlink carrier frequency spacing corresponding to the first cell; and an analysis unit 62, configured to determine, according to the indication information, the uplink-downlink carrier frequency spacing corresponding to the first cell.

Optionally, when receiving the indication message sent by the base station, the receiving unit 61 is configured to:

after performing network synchronization with the base station by using a PSS and an SSS that are corresponding to the first cell, parse the indication information carried in a newly added message of $\log_2(L+K)-\log_2(L)$ bits, where a total quantity of sequences included in a candidate sequence set of the PSS and the SSS is extended from L to L+K, and L and K are positive integers.

Optionally, when receiving the indication message sent by the base station, the receiving unit 61 is configured to:

after completing network synchronization with the base station, receive broadcast information that is sent by the base station and that carries the indication message.

Optionally, the broadcast message that carries the indication message carries the indication message in a master information block MIB or a system information block SIB.

Optionally, when receiving the indication message sent by the base station, the receiving unit 61 is configured to:

receive a broadcast message that is sent by the base station and that does not carry the indication message, and obtain random access channel PRACH information by using the broadcast information that does not carry the indication message;

send a random access message to the base station according to the PRACH information; and receive RACH response information or higher layer signaling sent by the base station, where the RACH response information carries the indication message, or the higher layer signaling carries the indication message.

Optionally, when determining, according to the indication information, the uplink-downlink carrier frequency spacing corresponding to the first cell, the analysis unit 62 is configured to:

when determining that the indication information carries an uplink-downlink basic carrier frequency spacing corresponding to a frequency band used by the first cell, an index number corresponding to a first carrier frequency deviation in a first carrier frequency deviation set, and a difference between index numbers of uplink and downlink physical resource blocks used by the first cell, determine the first carrier frequency deviation according to the index number corresponding to the first carrier frequency deviation in the first carrier frequency deviation set; and calculate a sum of the first carrier frequency deviation, the basic carrier frequency spacing, and a product of physical resource block bandwidth and the difference between the index numbers of the uplink and downlink physical resource blocks, to obtain the uplink-downlink carrier frequency spacing of the first cell, where the first carrier frequency deviation set includes all possible carrier frequency deviations and index numbers corresponding to all the carrier frequency deviations, or includes all possible in-band carrier frequency deviations and index numbers corresponding to all the in-band carrier frequency deviations.

Optionally, when determining, according to the indication information, the uplink-downlink carrier frequency spacing corresponding to the first cell, the analysis unit 62 is configured to:
- when determining that the indication information carries an uplink-downlink basic carrier frequency spacing corresponding to a frequency band used by the first cell, an index number corresponding to a second carrier frequency deviation in a second carrier frequency deviation set, and a subcarrier quantity deviation corresponding to the first cell, determine the second carrier frequency deviation according to the index number corresponding to the second carrier frequency deviation in the second carrier frequency deviation set; and
- calculate a sum of the basic carrier frequency spacing, the second carrier frequency deviation, and a product of the subcarrier quantity deviation and subcarrier bandwidth, to obtain the uplink-downlink carrier frequency spacing of the first cell, where
- the second carrier frequency deviation set includes all possible carrier frequency deviations and index numbers corresponding to all the carrier frequency deviations, or includes all possible guard band carrier frequency deviations and index numbers corresponding to all the guard band carrier frequency deviations.

Optionally, when determining, according to the indication information, the uplink-downlink carrier frequency spacing corresponding to the first cell, the analysis unit 62 is configured to:
- when UE determines that the indication information carries the uplink-downlink carrier frequency spacing of the first cell, directly obtain the uplink-downlink carrier frequency spacing of the first cell.

Optionally, when determining, according to the indication information, the uplink-downlink carrier frequency spacing corresponding to the first cell, the analysis unit 62 is configured to:
- determine that the indication information carries an index number corresponding to the uplink-downlink carrier frequency spacing of the first cell in a preset carrier frequency spacing set; and
- determine the uplink-downlink carrier frequency spacing of the first cell according to the index number corresponding to the uplink-downlink carrier frequency spacing of the first cell in the preset carrier frequency spacing set, where
- if an NB-IoT operation mode preset by the first cell is an in-band operation mode, the preset carrier frequency spacing set includes all possible carrier frequency spacings and index numbers corresponding to all the carrier frequency spacings, or includes all possible in-band carrier frequency deviations and index numbers corresponding to all the in-band carrier frequency deviations; or
- if an NB-IoT operation mode preset by the first cell is identified as a guard band operation mode, the preset carrier frequency spacing set includes all possible carrier frequency spacings and index numbers corresponding to all the carrier frequency spacings, or includes all possible guard band carrier frequency deviations and index numbers corresponding to all the guard band carrier frequency deviations.

Optionally, when determining, according to the indication information, the uplink-downlink carrier frequency spacing corresponding to the first cell, the analysis unit 62 is configured to:
- determine that the indication information carries an uplink center frequency corresponding to the first cell, and use the uplink center frequency for access.

Optionally, when determining, according to the indication information, the uplink-downlink carrier frequency spacing corresponding to the first cell, the analysis unit 62 is configured to:
- determine that the indication information carries index numbers of uplink and downlink physical resource blocks corresponding to the first cell, and determine a corresponding index number of an LTE uplink physical resource block according to the index number of the downlink physical resource block corresponding to the first cell; and
- determine, according to the index number of the LTE uplink physical resource block and the index number of the uplink physical resource block corresponding to the first cell, a first carrier frequency deviation corresponding to the first cell and an uplink-downlink basic carrier frequency spacing corresponding to a frequency band used by the first cell, and calculate a sum of the first carrier frequency deviation and the basic carrier frequency spacing to obtain the uplink-downlink carrier frequency spacing of the first cell.

It should be noted that module division in this embodiment of the present invention is an example, is merely logical function division, and may be other division in actual implementation. In addition, function modules in embodiments of this application may be integrated into one processing module, or each of the modules may exist alone physically, or two or more modules may be integrated into one module. The integrated module may be implemented in a form of hardware, or may be implemented in a form of a software function module.

If the integrated module is implemented in the form of a software function module and sold or used as an independent product, the integrated module may be stored in a computer-readable storage medium. Based on such an understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

Figure 7:
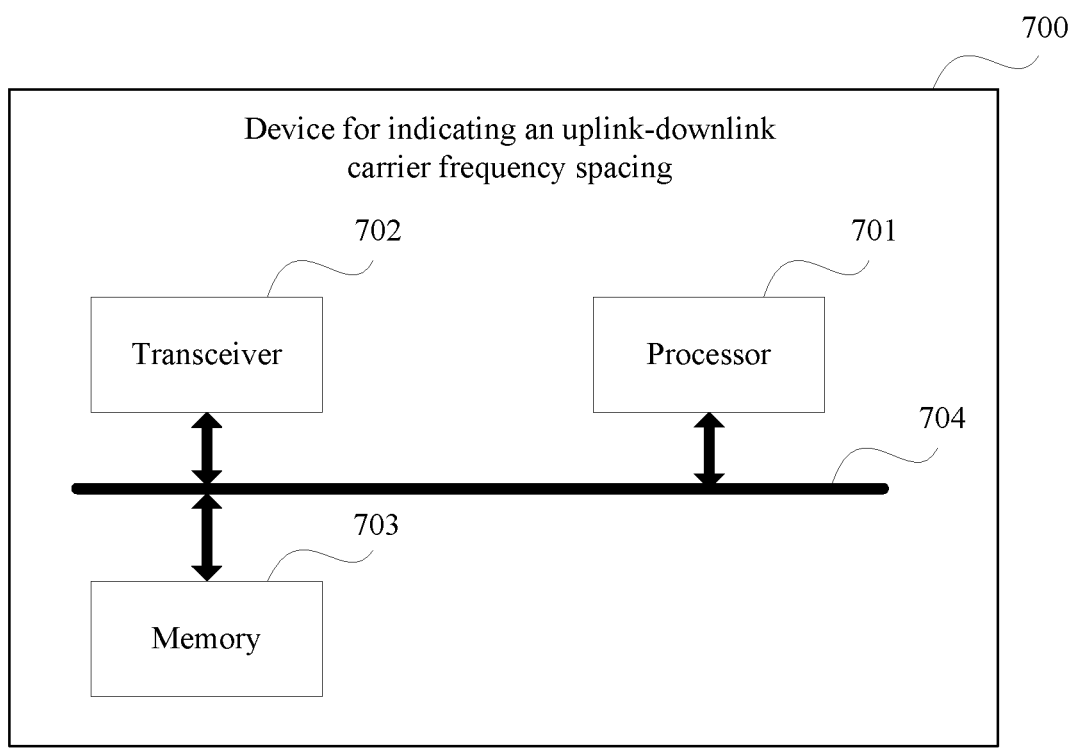
FIG. 7 is a schematic structural diagram of a device for indicating an uplink-downlink carrier frequency spacing according to an embodiment of the present invention.

Referring to FIG. 7, an embodiment of the present invention further provides a device for indicating an uplink-downlink carrier frequency spacing. As shown in FIG. 7, FIG. 7 is a schematic structural diagram of a device 700 for indicating an uplink-downlink carrier frequency spacing according to this embodiment of the present invention. The device includes a processor 701, a transceiver 702, and a memory 703. The transceiver 702, the processor 701, and the memory 703 are connected to each other. A specific connection medium between the foregoing components is not limited in this embodiment of the present invention. In this embodiment of the present invention, in FIG. 7, the memory 703, the processor 701, and the transceiver 702 are connected by using a bus 704. The bus is represented by using a bold line in FIG. 7. A manner of connection between other components is only an example for description, and is not limited thereto. The bus may be classified into an address bus, a data bus, a control bus, and the like. For ease of representation, only one bold line is used in FIG. 7 for representation, but it does not indicate that there is only one bus or one type of bus.

In this embodiment of the present invention, the processor 701 is configured to: obtain a determining parameter used to determine an uplink-downlink carrier frequency spacing of a first cell, and generate indication information according to the determining parameter, where the indication message is used to indicate the uplink-downlink carrier frequency spacing of the first cell.

The transceiver 702 is configured to send the indication information to a terminal device (UE) that initiates a request in the first cell to access an NB-IoT.

In this embodiment of the present invention, the memory 703 is configured to store program code executed by the processor 701, and may be a volatile memory, for example, a random access memory (RAM). Alternatively, the memory 703 may be a non-volatile memory, for example, a read-only memory (ROM), a flash memory, a hard disk drive (HDD), or a solid-state drive (SSD). Alternatively, the memory 703 is any other medium that can be used to carry or store expected program code in a command or data structure form and that can be accessed by a computer. However, this is not limited thereto. The memory 703 may be a combination of the foregoing memories.

In this embodiment of the present invention, the processor 701 may be a central processing unit (CPU).

Figure 8:
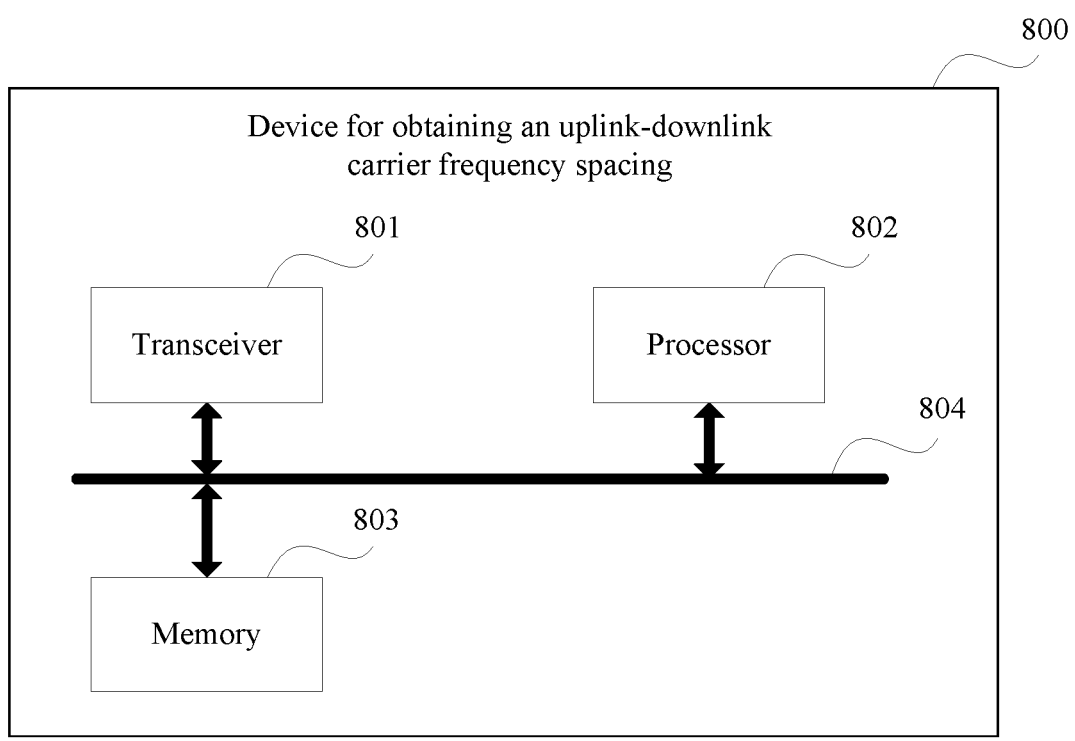
FIG. 8 is a schematic structural diagram of a device for obtaining an uplink-downlink carrier frequency spacing according to an embodiment of the present invention.

Referring to FIG. 8, an embodiment of the present invention further provides a device for obtaining an uplink-downlink carrier frequency spacing. As shown in FIG. 8, FIG. 8 is a schematic structural diagram of a device 800 for obtaining an uplink-downlink carrier frequency spacing according to this embodiment of the present invention. The device includes a transceiver 801, a processor 802, and a memory 803. The transceiver 801, the processor 802, and the memory 803 are connected to each other. A specific connection medium between the foregoing components is not limited in this embodiment of the present invention. In this embodiment of the present invention, in FIG. 8, the memory 803, the processor 802, and the transceiver 801 are connected by using a bus 804. The bus is represented by using a bold line in FIG. 8. A manner of connection between other components is only an example for description, and is not limited thereto. The bus may be classified into an address bus, a data bus, a control bus, and the like. For ease of representation, only one bold line is used in FIG. 8 for representation, but it does not indicate that there is only one bus or one type of bus.

In this embodiment of the present invention, the transceiver 801 is configured to: initiate a request in a first cell to access an NB-IoT, and receive an indication message sent by a base station, where the indication message is used to indicate an uplink-downlink carrier frequency spacing corresponding to the first cell.

The processor 802 is configured to determine, according to the indication information, the uplink-downlink carrier frequency spacing corresponding to the first cell.

In this embodiment of the present invention, the memory 803 is configured to store program code executed by the processor 802, and may be a volatile memory, for example, a random access memory (RAM). Alternatively, the memory 803 may be a non-volatile memory, for example, a read-only memory (ROM), a flash memory, a hard disk drive (HDD), or a solid-state drive (SSD). Alternatively, the memory 803 is any other medium that can be used to carry or store expected program code in a command or data structure form and that can be accessed by a computer. However, this is not limited thereto. The memory 803 may be a combination of the foregoing memories.

In this embodiment of the present invention, the processor 802 may be a central processing unit (CPU).

In conclusion, the base station obtains the determining parameter used to determine the uplink-downlink carrier frequency spacing of the first cell, and generates the indication information according to the determining parameter. According to the NB-IoT operation mode preset by the first cell and various different application scenarios, different determining parameters are obtained, and multiple types of indication information are generated. Therefore, diversity of indicating by the base station is improved. The indication message is used to indicate the uplink-downlink carrier frequency spacing of the first cell. The base station sends the indication information to the terminal device (UE) that initiates a request in the first cell to access the NB-IoT. The base station may obtain, in different scenarios, the determining parameter used to determine the uplink-downlink carrier frequency spacing of the first cell, and generate the indication information according to the determining parameter. According to the NB-IoT operation mode preset by the first cell and various different application scenario requirements, different indication information content may be determined, and multiple types of indication information may be generated. Therefore, flexibility and diversity of indicating the uplink-downlink carrier frequency spacing of the first cell are improved. The indication message is used to indicate the uplink-downlink carrier frequency spacing of the first cell. The base station sends the indication information to the terminal device (UE) that initiates a request in the first cell to access the NB-IoT. The indication information may be sent on different occasions according to a requirement, and therefore flexibility of indicating the uplink-downlink carrier frequency spacing of the first cell by the base station is improved.

The UE initiates a request in the first cell to access the NB-IoT, and receives the indication message sent by the base station, where the indication message is used to indicate the uplink-downlink carrier frequency spacing corresponding to the first cell. The UE receives the indication information on different occasions, and the UE determines, according to the indication information, the uplink-downlink carrier frequency spacing corresponding to the first cell. The uplink-downlink carrier frequency spacing corresponding to the first cell is parsed herein according to different types of indication information, so that the terminal implements access at a correct NB-IoT uplink carrier frequency.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. A method for obtaining an uplink-downlink carrier frequency spacing, wherein the method is applied to an Narrowband Internet of Things (NB-IoT) system, and comprises:

initiating, by a terminal device (UE), a request in a first cell to access an NB-IoT, and receiving an indication message sent by a base station, wherein the indication message is used to indicate an uplink-downlink carrier frequency spacing corresponding to the first cell; and determining, by the UE according to the indication information, the uplink-downlink carrier frequency spacing corresponding to the first cell, wherein when the UE determines that the indication information carries an uplink-downlink basic carrier frequency spacing corresponding to a frequency band used by the first cell, an index number corresponding to a first carrier frequency deviation in a first carrier frequency deviation set, and a difference between index numbers of uplink and downlink physical resource blocks used by the first cell, determining, by the LE, the first carrier frequency deviation according to the index number corresponding to the first carrier frequency deviation in the first carrier frequency deviation set.

2. The method according to claim 1, wherein the receiving, by the UE, an indication message sent by a base station comprises:

after the UE performs network synchronization with the base station by using a primary synchronization signal (PSS) and a secondary synchronization signal (SSS) that are corresponding to the first cell, parsing, by the UE, the indication information carried in a newly added message of $\log_2(L+K)-\log_2(L)$ bits, wherein a total quantity of sequences comprised in a candidate sequence set of the PSS and the SSS is extended from L to L+K, and L and K are positive integers.

3. The method according to claim 1, wherein the receiving, by the UE, an indication message sent by a base station comprises:

after the UE completes network synchronization with the base station, receiving, by the UE, broadcast information that is sent by the base station and that carries the indication message.

4. The method according to claim 3, wherein the broadcast message that carries the indication message carries the indication message in a master information block (MIB) or a system information block (SIB).

5. The method according to claim 1, wherein the receiving, by the UE, an indication message sent by a base station comprises:

receiving, by the UE, a broadcast message that is sent by the base station and that does not carry the indication message, and obtaining random access channel (PRACH) information by using the broadcast information that does not carry the indication message;

sending, by the UE, a random access message to the base station according to the PRACH information; and receiving, by the UE, random access channel (RACH) response information or higher layer signaling sent by the base station, wherein the RACH response information carries the indication message, or the higher layer signaling carries the indication message.

6. The method according to claim 1, wherein the determining, by the UE according to the indication information, the uplink-downlink carrier frequency spacing corresponding to the first cell comprises:

calculating, by the UE, a sum of the first carrier frequency deviation, the uplink-downlink basic carrier frequency spacing, and a product of physical resource block bandwidth and the difference between the index numbers of the uplink and downlink physical resource blocks, to obtain the uplink-downlink carrier frequency spacing of the first cell, wherein the first carrier frequency deviation set comprises all possible carrier frequency deviations and index numbers corresponding to all the carrier frequency deviations, or comprises all possible in-band carrier frequency deviations and index numbers corresponding to all the in-band carrier frequency deviations.

7. The method according to claim 1, wherein the determining, by the UE according to the indication information, the uplink-downlink carrier frequency spacing corresponding to the first cell comprises:

when the UE determines that the indication information carries an uplink-downlink basic carrier frequency spacing corresponding to a frequency band used by the first cell, an index number corresponding to the second carrier frequency deviation in a second carrier frequency deviation set, and a subcarrier quantity deviation corresponding to the first cell, determining, by the UE, the second carrier frequency deviation according to the index number corresponding to the second carrier frequency deviation in the second carrier frequency deviation set; and calculating, by the UE, a sum of the uplink-downlink basic carrier frequency spacing, the second carrier frequency deviation, and a product of the subcarrier quantity deviation and subcarrier bandwidth, to obtain the uplink-downlink carrier frequency spacing of the first cell, wherein the second carrier frequency deviation set comprises all possible carrier frequency deviations and index numbers corresponding to all the carrier frequency deviations, or comprises all possible guard band carrier frequency deviations and index numbers corresponding to all the guard band carrier frequency deviations.

8. The method according to claim 1, wherein the determining, by the UE according to the indication information, the uplink-downlink carrier frequency spacing corresponding to the first cell comprises:
when the UE determines that the indication information carries the uplink-downlink carrier frequency spacing of the first cell, directly obtaining, by the UE, the uplink-downlink carrier frequency spacing of the first cell.

9. The method according to claim 1, wherein the determining, by the UE according to the indication information, the uplink-downlink carrier frequency spacing corresponding to the first cell comprises:
determining, by the UE, that the indication information carries an index number corresponding to the uplink-downlink carrier frequency spacing of the first cell in a preset carrier frequency spacing set; and
determining, by the UE, the uplink-downlink carrier frequency spacing of the first cell according to the index number corresponding to the uplink-downlink carrier frequency spacing of the first cell in the preset carrier frequency spacing set, wherein
if an NB-IoT operation mode preset by the first cell is an in-band operation mode, the preset carrier frequency spacing set comprises all possible carrier frequency spacings and index numbers corresponding to all the carrier frequency spacings, or comprises all possible in-band carrier frequency deviations and index numbers corresponding to all the in-band carrier frequency deviations; or
if an NB-IoT operation mode preset by the first cell is identified as a guard band operation mode, the preset carrier frequency spacing set comprises all possible carrier frequency spacings and index numbers corresponding to all the carrier frequency spacings, or comprises all possible guard band carrier frequency deviations and index numbers corresponding to all the guard band carrier frequency deviations.

10. The method according to claim 1, wherein the determining, by the UE according to the indication information, the uplink-downlink carrier frequency spacing corresponding to the first cell comprises:
determining, by the UE, that the indication information carries an uplink center frequency corresponding to the first cell, and using, by the UE, the uplink center frequency for access.

11. The method according to claim 1, wherein the determining, by the UE according to the indication information, the uplink-downlink carrier frequency spacing corresponding to the first cell comprises:

determining, by the UE, that the indication information carries index numbers of uplink and downlink physical resource blocks corresponding to the first cell, and determining, by the UE, a corresponding index number of an long term evolution (LTE) uplink physical resource block according to the index number of the downlink physical resource block corresponding to the first cell; and determining, according to the index number of the LTE uplink physical resource block and the index number of the uplink physical resource block corresponding to the first cell, a first carrier frequency deviation corresponding to the first cell and an uplink-downlink basic carrier frequency spacing corresponding to a frequency band used by the first cell, and calculating a sum of the first carrier frequency deviation and the uplink-downlink basic carrier frequency spacing to obtain the uplink-downlink carrier frequency spacing of the first cell.

12. An apparatus for obtaining an uplink-downlink carrier frequency spacing, wherein the apparatus is applied to an Narrowband Internet of Things (NB-IoT) system, and comprises:
a transceiver, configured to: initiate a request in a first cell to access an NB-IoT, and receive an indication message sent by a base station, wherein the indication message is used to indicate an uplink-downlink carrier frequency spacing corresponding to the first cell; and
a processor, configured to determine, according to the indication information, the uplink-downlink carrier frequency spacing corresponding to the first cell, wherein
when the processor determines that the indication information carries an uplink-downlink basic carrier frequency spacing corresponding to a frequency band used by the first cell, an index number corresponding to a first carrier frequency deviation in a first carrier frequency deviation set, and a difference between index numbers of uplink and downlink physical resource blocks used by the first cell, the processor further configured to determine the first carrier frequency deviation according to the index number corresponding to the first carrier frequency deviation in the first carrier frequency deviation set.

13. The apparatus according to claim 12, wherein when receiving the indication message sent by the base station, the transceiver is configured to:
after performing network synchronization with the base station by using a primary synchronization signal (PSS) and a secondary synchronization signal (SSS) that are corresponding to the first cell, parse the indication information carried in a newly added message of $\log_2(L+K)-\log_2(L)$ bits, wherein
a total quantity of sequences comprised in a candidate sequence set of the PSS and the SSS is extended from L to L+K, and L and K are positive integers.

14. The apparatus according to claim 12, wherein when receiving the indication message sent by the base station, the transceiver is configured to:
after completing network synchronization with the base station, receive broadcast information that is sent by the base station and that carries the indication message.

15. The apparatus according to claim 14, wherein the broadcast message that carries the indication message carries the indication message in a master information block (MIB) or a system information block (SIB).

16. The apparatus according to claim 15, wherein when receiving the indication message sent by the base station, the transceiver is configured to:

receive a broadcast message that is sent by the base station and that does not carry the indication message, and obtain random access channel (PRACH) information by using the broadcast information that does not carry the indication message;

send a random access message to the base station according to the PRACH information; and receive random access channel (RACH) response information or higher layer signaling sent by the base station, wherein the RACH response information carries the indication message, or the higher layer signaling carries the indication message.

17. The apparatus according to claim 13, wherein when determining, according to the indication information, the uplink-downlink carrier frequency spacing corresponding to the first cell, the processor is configured to:

calculate a sum of the first carrier frequency deviation, the uplink-downlink basic carrier frequency spacing, and a product of physical resource block bandwidth and the difference between the index numbers of the uplink and downlink physical resource blocks, to obtain the uplink-downlink carrier frequency spacing of the first cell, wherein the first carrier frequency deviation set comprises all possible carrier frequency deviations and index numbers corresponding to all the carrier frequency deviations, or comprises all possible in-band carrier frequency deviations and index numbers corresponding to all the in-band carrier frequency deviations.

18. The apparatus according to claim 12, wherein when determining, according to the indication information, the uplink-downlink carrier frequency spacing corresponding to the first cell, the processor is configured to:

when determining that the indication information carries an uplink-downlink basic carrier frequency spacing corresponding to a frequency band used by the first cell, an index number corresponding to the second carrier frequency deviation in a second carrier frequency deviation set, and a subcarrier quantity deviation corresponding to the first cell, determine the second carrier frequency deviation according to the index number corresponding to the second carrier frequency deviation in the second carrier frequency deviation set; and calculate a sum of the uplink-downlink basic carrier frequency spacing, the second carrier frequency deviation, and a product of the subcarrier quantity deviation and subcarrier bandwidth, to obtain the uplink-downlink carrier frequency spacing of the first cell, wherein the second carrier frequency deviation set comprises all possible carrier frequency deviations and index numbers corresponding to all the carrier frequency deviations, or comprises all possible guard band carrier frequency deviations and index numbers corresponding to all the guard band carrier frequency deviations.

19. The apparatus according to claim 12, wherein when determining, according to the indication information, the uplink-downlink carrier frequency spacing corresponding to the first cell, the processor is configured to:

when determining that the indication information carries the uplink-downlink carrier frequency spacing of the first cell, directly obtain the uplink-downlink carrier frequency spacing of the first cell.

20. A computer program product comprising non-transitory computer readable medium comprising instructions which, when executed by a computer, cause the computer to carry out operations that perform a method for obtaining an uplink-downlink carrier frequency spacing, wherein the method is applied to an Narrowband Internet of Things (NB-IoT) system, the operations comprising:

initiating a request in a first cell to access an NB-IoT, and receiving an indication message sent by a base station, wherein the indication message is used to indicate an uplink-downlink carrier frequency spacing corresponding to the first cell; and determining, according to the indication information, the uplink-downlink carrier frequency spacing corresponding to the first cell, wherein in response to a that the indication information carries an uplink-downlink basic carrier frequency spacing corresponding to a frequency band used by the first cell, an index number corresponding to a first carrier frequency deviation in a first carrier frequency deviation set, and a difference between index numbers of uplink and downlink physical resource blocks used by the first cell, determining the first carrier frequency deviation according to the index number corresponding to the first carrier frequency deviation in the first carrier frequency deviation set.

* * * * *

UNITED STATES PATENT AND TRADEMARK OFFICE
CERTIFICATE OF CORRECTION

PATENT NO. : 10,542,506 B2
APPLICATION NO. : 15/971854
DATED : January 21, 2020
INVENTOR(S) : Zheng Liu, Yubo Yang and Chao Luo Page 1 of 1

It is certified that error appears in the above-identified patent and that said Letters Patent is hereby corrected as shown below:

In the Claims

In Claim 1, Column 31, Line 66, "be the first cell, determining, by the LE, the first carrier" should read "by the first cell, determining, by the UE, the first carrier"

Signed and Sealed this
Fifteenth Day of December, 2020

Andrei Iancu
*Director of the United States Patent and Trademark Office*